(12) United States Patent
Green

(10) Patent No.: US 9,049,023 B2
(45) Date of Patent: Jun. 2, 2015

(54) OUTSOURCING THE DECRYPTION OF FUNCTIONAL ENCRYPTION CIPHERTEXTS

(75) Inventor: Matthew Daniel Green, Baltimore, MD (US)

(73) Assignee: Zeutro LLC, Austin, TX (US)

( * ) Notice: Subject to any disclaimer, the term of this patent is extended or adjusted under 35 U.S.C. 154(b) by 0 days.

(21) Appl. No.: 13/477,306

(22) Filed: May 22, 2012

(65) Prior Publication Data

US 2012/0300936 A1 Nov. 29, 2012

Related U.S. Application Data

(60) Provisional application No. 61/489,428, filed on May 24, 2011.

(51) Int. Cl.
*H04L 12/22* (2006.01)
*H04L 9/30* (2006.01)
*H04L 9/08* (2006.01)
*H04L 12/813* (2013.01)

(52) U.S. Cl.
CPC .............. *H04L 9/3073* (2013.01); *H04L 9/088* (2013.01); *H04L 2209/76* (2013.01)

(58) Field of Classification Search
CPC ............. H04L 9/12; H04L 9/32; H04L 12/22; H04L 12/2461
See application file for complete search history.

(56) References Cited

U.S. PATENT DOCUMENTS

| | | |
|---|---|---|
| 5,046,094 A | 9/1991 | Kawamura et al. |
| 5,369,708 A | 11/1994 | Kawamura et al. |
| 6,779,111 B1 | 8/2004 | Gehrmann et al. |
| 7,003,117 B2 | 2/2006 | Kacker et al. |
| 7,580,521 B1 | 8/2009 | Spies et al. |
| 7,590,236 B1 | 9/2009 | Boneh et al. |
| 7,634,085 B1 | 12/2009 | Sahai et al. |
| 7,991,151 B2 | 8/2011 | Lefranc et al. |
| 8,023,646 B2 | 9/2011 | Boyen |
| 2008/0046757 A1 | 2/2008 | Staddon et al. |
| 2008/0059787 A1 | 3/2008 | Hohenberger et al. |
| 2009/0080658 A1 | 3/2009 | Waters et al. |
| 2009/0285386 A1 | 11/2009 | Takashima |

(Continued)

OTHER PUBLICATIONS

Outsourcing the Decryption of ABE Cipphertexts. Green et al. USENIX. Aug. 2011.*

(Continued)

*Primary Examiner* — Venkat Perungavoor
(74) *Attorney, Agent, or Firm* — CipherLaw

(57) ABSTRACT

Functional encryption (FE) ciphertext is transformed into partially-decrypted (PD) ciphertext. The PD ciphertext has a shorter bit length than the FE ciphertext, or the decryption time of the PD ciphertext is less than the decryption time of the FE ciphertext. The FE ciphertext can be an attribute-based encryption ciphertext. The transformation can be performed with a transformation key generated by an authority with a master key or by a user with a decryption key. The transformation can also be performed, without a transformation key, based on unencrypted components of the FE ciphertext and on auxiliary information associated with the unencrypted components of the FE ciphertext. The PD ciphertext can require less transmission time across a network than the FE ciphertext. The PD ciphertext can require less time to decrypt than the FE ciphertext, particularly when the computational resources performing the decryption are limited.

47 Claims, 22 Drawing Sheets

(56) References Cited

U.S. PATENT DOCUMENTS

2010/0185861 A1   7/2010   Chase et al.
2011/0110525 A1   5/2011   Gentry

OTHER PUBLICATIONS

Attribute Based Proxy Re-encryption with Delegating Capabilities. Liang et al. ACM(2009).*
Identity-Based Proxy Re-Encryption. Green et al.ANCS(2007).*
Strong Biding for Software Key Escrow. Viswanathan et al.IEEE(1999).*
Achieving Secure, Scalable, and Fine-grained Data Access Control in Cloud Computing. Yu et al. IEEE(2010).*
Privacy Preserving Ciphertext Policy Attribute Based Encryption. Balu et al. Springer-Verlag Berlin-Hiedelberg(2010).*
Hypervised Technique in Multi-Posture Attribure Based Key Generation. Kalaiselvi et al.IJACT(2011).*
Attribute Based Encryption with Verifiable Outsourced Decryption. Kumar. IJARCSSE(2014).*
How to Delegate and Verify in Public: Verifiable Computation from Attribute-based Encryption. Parno et al. ACM. 2012.*
Extensions of access structures and their cryptographic applications. Daza et al. Springer (2010).*
Hierarchical attribute-based encryption and scalable user revocation for sharing data in cloud servers. Wang et al. Computers and Security(2011).*
Transformation-Free Proxy Cryptosystems and Their Applications to Electronic Commerce. Wang et al. Proceedings of 2004 International Conference on Information Security(2004).*
EASier: Encryption-based Access Control on Social Networks with Efficient Revocation. Jahid et al. ASIACCS(2011).*
Fine-Grained Access Control System based on Outsourced Attribute-based Encryption. Li et al. ESORICS(2013).*
Asokan, N., et al. "Server-Supported Signatures", Journal of Computer Security, 5(1): 91-108, 1997.
Bethencourt, John, et al., "Ciphertext-Policy Attribute-Based Encryption", Proceedings of the IEEE Symposium on Security and Privacy, pp. 321-334, 2007.
Blaze, Matt, et al. "Divertible Protocols and Atomic Proxy Cryptography", Proceedings of Eurocrypt, Lecture Notes in Computer Science, vol. 1403, Springer, pp. 127-144, 1998.
Chung, Kai-Min, et al., "Improved Delegation of Computation Using Fully Homomorphic Encryption", Proceedings of CRYPTO, Lecture Notes in Computer Science, vol. 6223, Springer, pp. 483-501, 2010.
Gennaro, Rosario, et al., "Non-Interactive Verifiable Computing: Outsourcing Computation to Untrusted Workers", Proceedings of CRYPTO, Lecture Notes in Computer Science, vol. 6223, Springer, pp. 465-482, 2010.
Goldwasser, Shafi, et al., "Delegating Computation: Interactive Proofs for Muggles", Proceedings of the 40th Annual ACM Symposium on Theory of Computing, pp. 113-122, 2008.
Goyal, Vipul, et al., "Attribute-Based Encryption for Fine-Grained Access Control of Encrypted Data", In Proceedings of the 13th ACM conference on Computer and communications security (CCS '06). ACM, New York, NY, USA, 89-98, 2006.
Goyal, Vipul, et al., "Bounded Ciphertext Policy Attribute Based Encryption". Proceedings of Automata, Languages and Programming (ICALP), Lecture Notes in Computer Science, vol. 5126, Springer, pp. 579-591, 2008.
Kang, Bo Gyeong, et al., "Efficient Delegation of Pairing Computation". Posted Publicly on the Cryptology ePrint Archive, Report 2005/259, pp. 1-7, Aug. 8, 2005.
Chevallier-Mames, Benoit, et al., "Secure Delegation of Elliptic Curve Pairings". Proceedings of Smart Card Research and Advanced Application, Lecture Notes in Computer Science, vol. 6035, Springer, pp. 24-35, 2010.
Sahai, et al., "Fuzzy Identity-Based Encryption", Proceedings of Eurocrypt, Lecture Notes in Computer Science, vol. 3494, Springer, pp. 457-473, 2005.

* cited by examiner

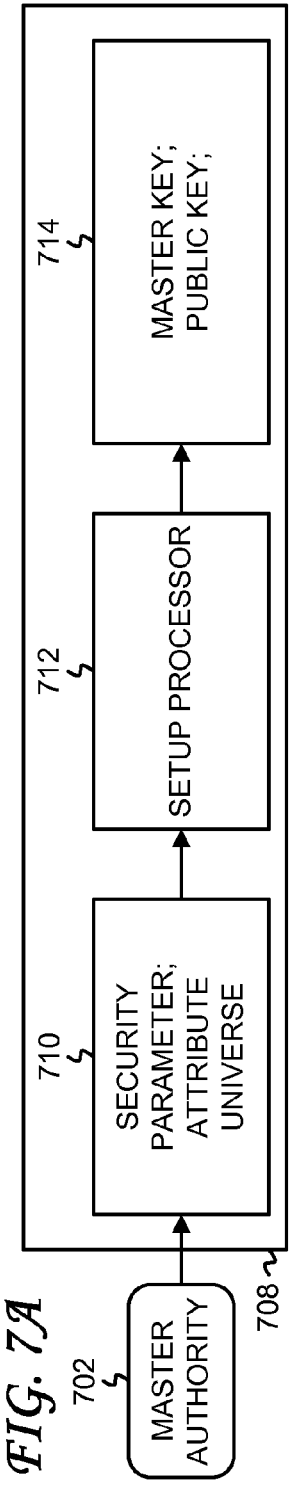
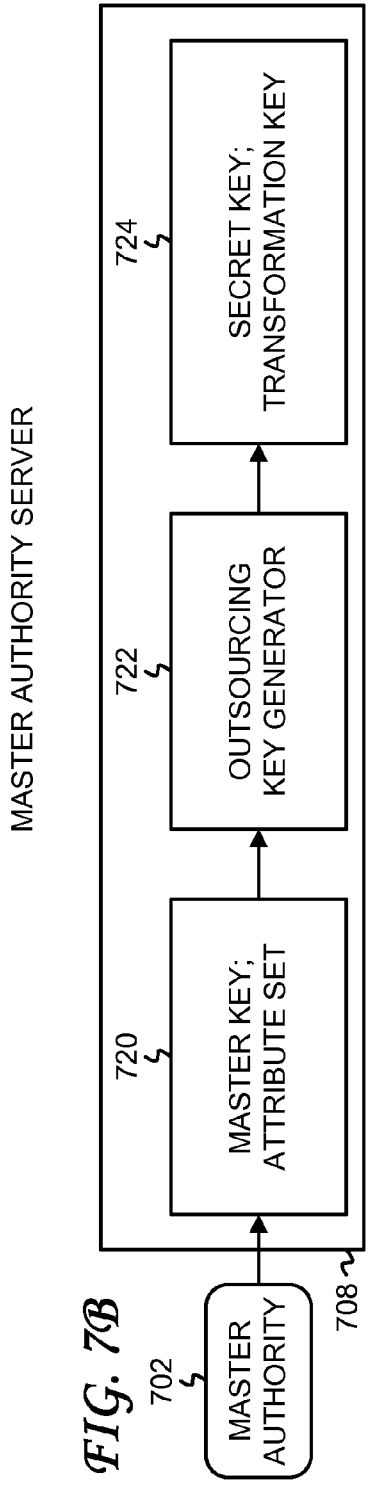
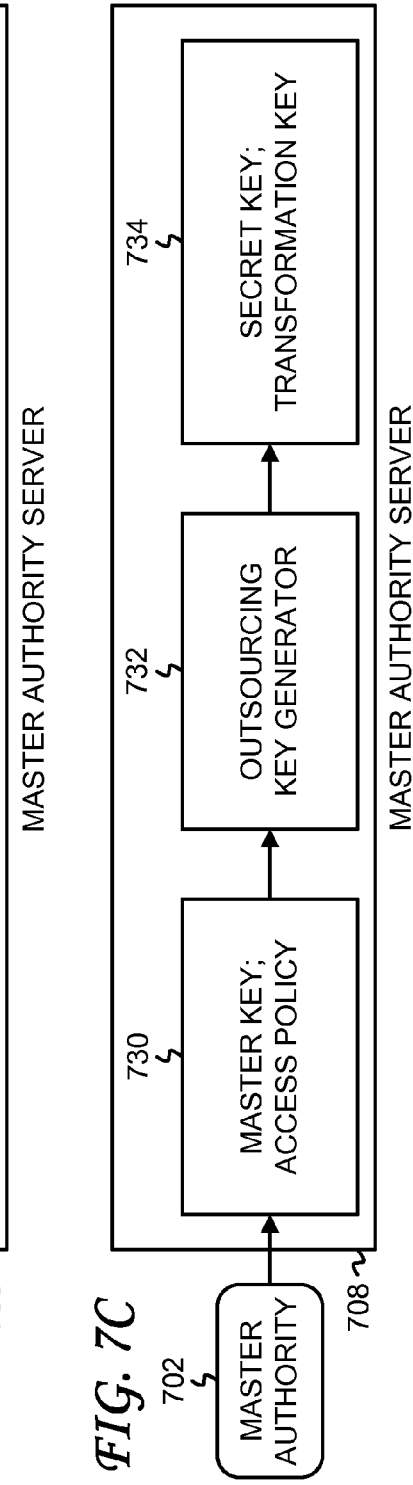

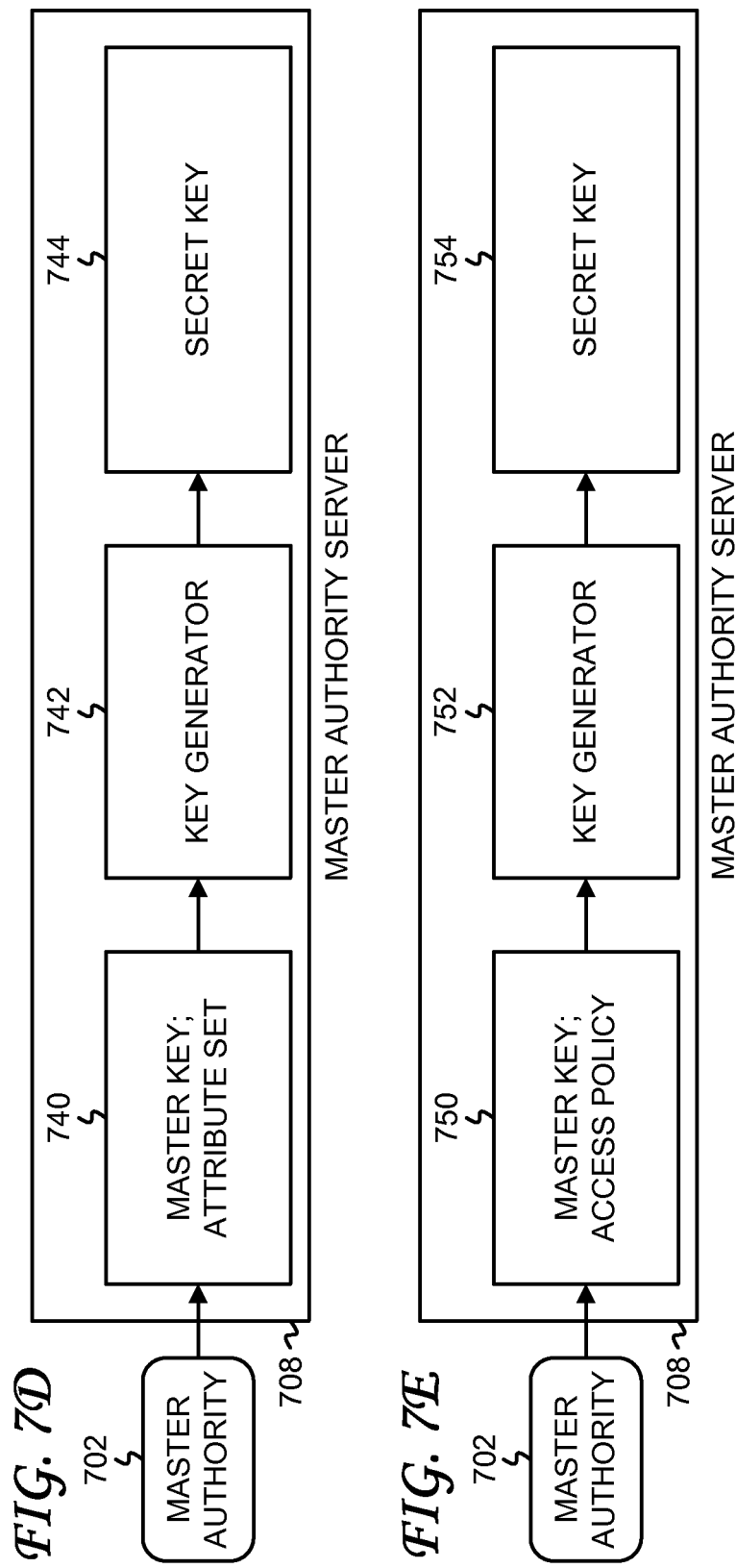

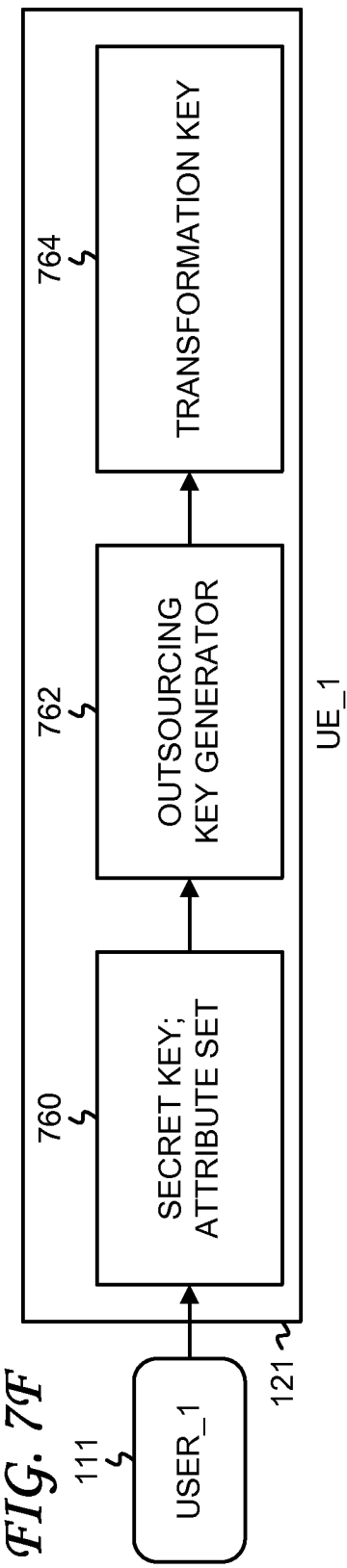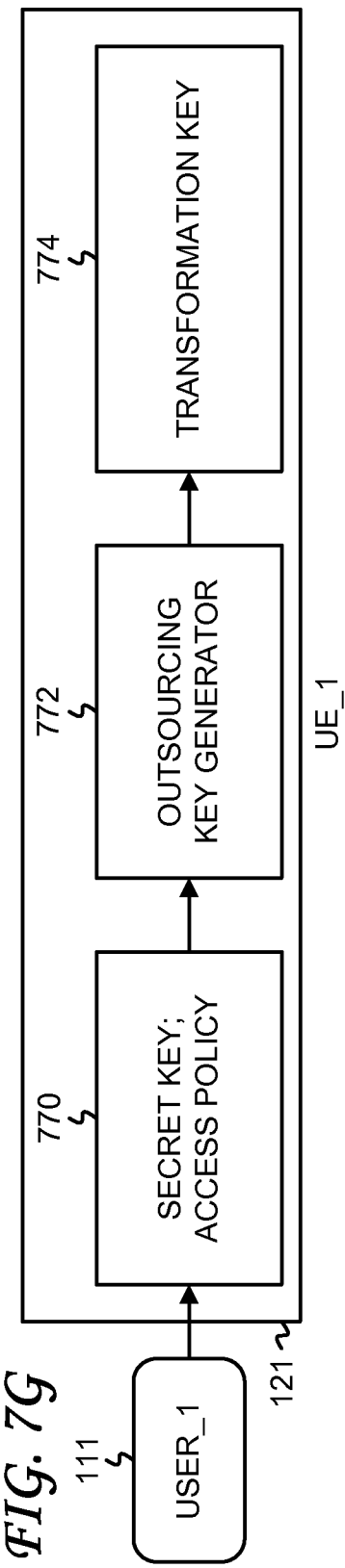

OUTSOURCING THE DECRYPTION OF FUNCTIONAL ENCRYPTION CIPHERTEXTS

This application claims the benefit of U.S. Provisional Application No. 61/489,428 filed May 24, 2011, which is incorporated herein by reference.

BACKGROUND OF THE INVENTION

The present invention relates generally to encryption, and more particularly to outsourcing the decryption of functional encryption ciphertexts.

Encryption has typically been implemented as a method for one user to encrypt data to another specific user (target recipient), such that only the target recipient can decrypt and read the message. In many applications, a more advantageous method is to encrypt data according to some policy, as opposed to a specified set of target recipients. In practice, however, implementing policy-based encryption on top of a traditional public key mechanism poses a number of difficulties. A user encrypting data, for example, will need a mechanism to look up all parties that have access credentials or attributes that match his set of target recipients. If a party's credentials themselves are restricted (for example, the set of users with special authorizations), the look-up mechanism itself can be difficult to implement. Problems also arise if a party gains credentials after data has been encrypted and stored.

Attribute-based encryption (ABE) for public key encryption allows users to encrypt and decrypt messages based on user attributes. A user, for example, can create a ciphertext that can be decrypted only by other users with attributes satisfying ("Faculty" OR ("PhD Student" AND "Qualifying Exams Completed")). Because of the expressiveness of ABE, ABE is currently being considered for many cloud storage and computing applications. A disadvantage of ABE, however, is its efficiency: the size of the ciphertext and the time required to decrypt it grows with the complexity of the access formula. Attribute-based encryption is one example of a functional encryption system, which more generally supports restricted secret keys that enable a key holder to learn a specific function of the encrypted data and nothing else.

BRIEF SUMMARY OF THE INVENTION

Functional encryption (FE) ciphertext is transformed into partially-decrypted (PD) ciphertext. The PD ciphertext has a shorter bit length than the FE ciphertext, or the decryption time of the PD ciphertext is less than the decryption time of the FE ciphertext. In an embodiment, the FE ciphertext is an attribute-based encryption (ABE) ciphertext.

In one embodiment, the transformation is performed with a transformation key. The transformation key can be generated by an authority with a master key, or the transformation key can be generated by a user with a decryption key. In another embodiment, the transformation is performed without a transformation key. The transformation is then performed based on unencrypted components of the FE ciphertext and on auxiliary information associated with the unencrypted components of the FE ciphertext.

In an embodiment, the FE ciphertext is received by a proxy, which transforms the FE ciphertext into PD ciphertext. The proxy sends the PD ciphertext over a communications network to a user equipment, which then decrypts the PD ciphertext. A PD ciphertext can require substantially less transmission time than the FE ciphertext. A PD ciphertext can be decrypted in substantially less time than the FE ciphertext; in particular, when the computational resources of the user equipment are substantially more limited than the computational resources of the proxy.

These and other advantages of the invention will be apparent to those of ordinary skill in the art by reference to the following detailed description and the accompanying drawings.

BRIEF DESCRIPTION OF THE DRAWINGS

FIG. 7A-FIG. 7G show high-level schematics of methods for key generation;

DETAILED DESCRIPTION

Figure 1:
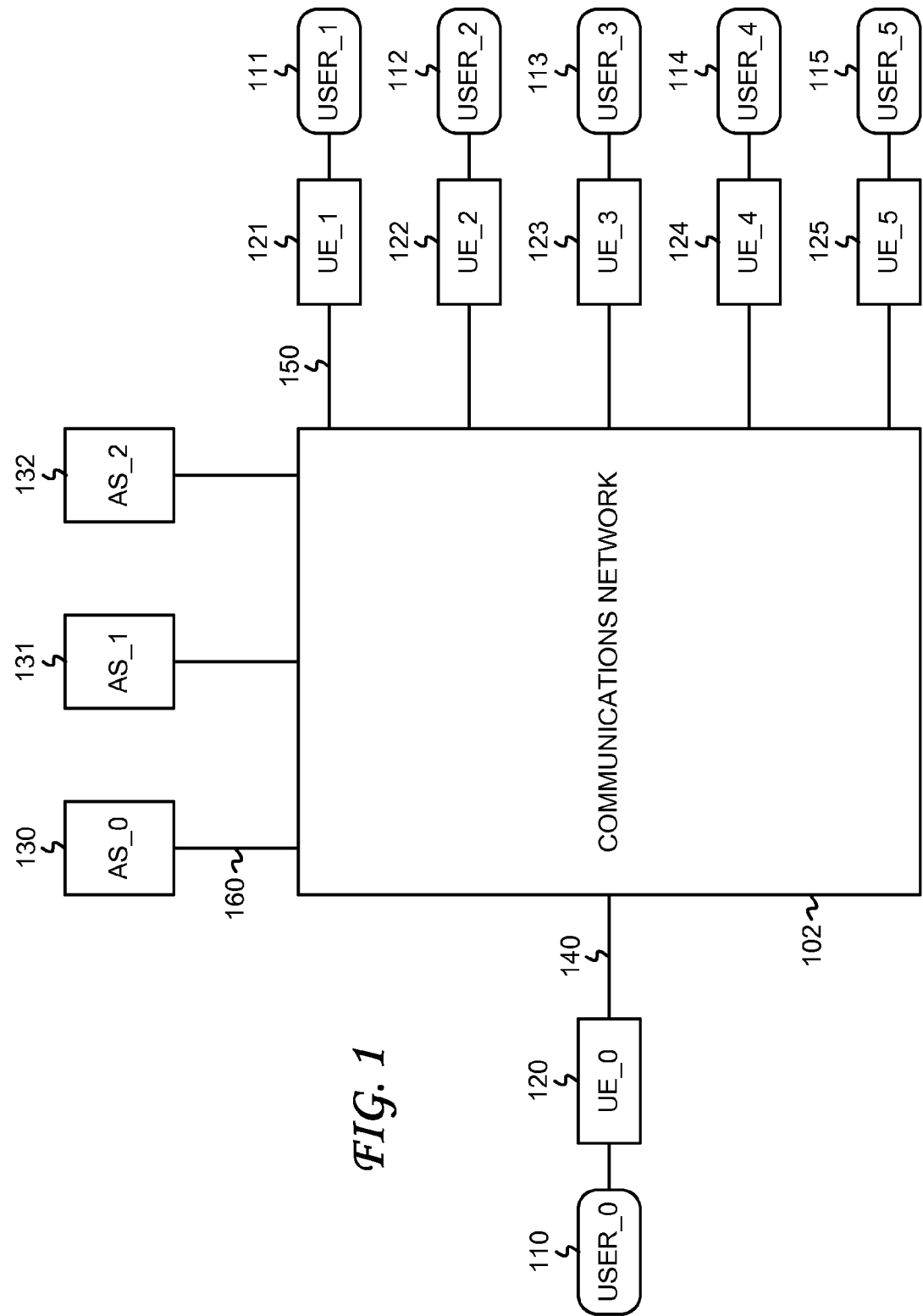
FIG. 1 shows a high-level schematic of a data communications system.

FIG. 1 shows a high-level schematic of a data communications system. Users and applications servers can communicate with each other via a communications network, which can be, for example, a local area network (LAN), a wide area network (WAN), combinations of multiple LANs and WANs internetworked together, or the global Internet.

A user communicates with the communications network (CN) 102 via a user equipment (UE). Shown are five representative users (referenced as user_0 110, user_1 111, user_2 112, user_3 113, user_4 114, and user_5 115) and five associated user equipment (referenced as UE_0 120, UE_1 121, UE_2 122, UE_3 123, UE_4 124, and UE_5 125, respectively). In the examples shown below, user_0 110 is designated as the sender of a message; user_1 111, user_2 112, user_3 113, user_4 114, and user_5 115 are designated as potential recipients of the message. Also shown are three representative applications servers (ASs) (referenced as AS_0 130, AS_1 131, and AS_2 132) that communicate with CN 102. Software can run independently on a user equipment, independently on an applications server, or jointly on a user equipment and an applications server as a client-server application.

The user equipment and the applications servers communicate with CN 102 via communications links (CLs). Shown are three representative communications links (referenced as CL 140, CL 150, and CL 160). The communications links can be provided over transport media such as wires and optical fibers. The communications links can also be provided over wireless transport media such as radiofrequency waves, microwaves, and free-space optics.

Typical examples of user equipment include desktop personal computers (PCs), laptop computers, and workstations. An increasingly popular piece of user equipment is a cellphone; in particular, a "smartphone" equipped with a data processor, memory, data storage device, video display, and user input device (such as a keypad or touchscreen). Firmware and software can be loaded onto a smartphone. Relative to corresponding components in a PC, a processor in a smartphone is typically slower, and the memory in a smartphone is typically slower and has lower capacity. Operational capabilities of a smartphone are also limited by battery capacity.

Applications servers can provide a variety of functions such as e-mail distribution, file storage, and video streaming. Applications servers can also provide generic "cloud-computing" functions. In cloud-computing, a user logs onto a website via a browser on his user equipment (such as a PC) and accesses various applications such as word processing, drawing, and photo-editing. With conventional PC-based applications, the user is responsible for installing, maintaining, and upgrading software and hardware required to support the applications. In cloud-computing, the user needs to maintain only a basic software and hardware configuration for accessing the website of the cloud-computing service provider. The software and hardware required to support the applications are the responsibility of the cloud-computing service provider and are transparent to the user.

Figure 2:
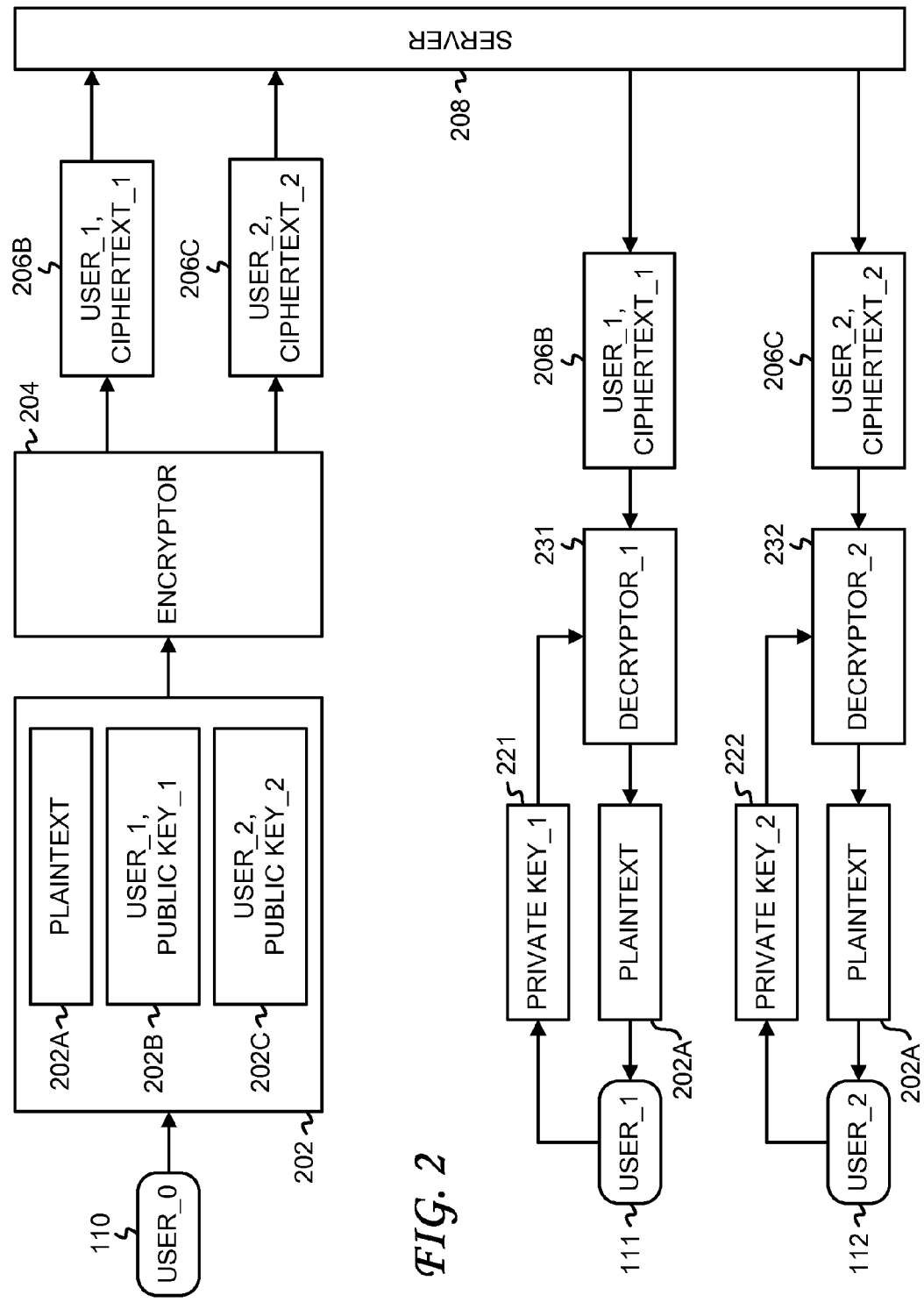
FIG. 2 shows a high-level schematic of a public key/private key encryption system.

Security of messages transported across CN 102 can be provided by an encryption-decryption system. FIG. 2 shows a high-level schematic of a conventional encryption-decryption system using a public key and a private key. The user_0 110 generates the input 202, which includes the unencrypted message (referred to as plaintext) 202A and the distribution list of recipients and their respective public keys. In this example, there are two recipients, the user_1 111 and the user_2 112; their public keys are the public key_1 202B and the public key_2 202C, respectively. Note: "message" and "plaintext", as used in discussions of encryption and decryption are not limited to short messages and text; they refer to user-defined data (including large files) in general.

The plaintext 202A, the public key_1 202B, and the public key_2 202C are inputted into the encryptor 204, which generates an individual encrypted message (referred to as ciphertext) for each recipient. The encryptor 204 encrypts the plaintext 202A using the public key_1 202B to generate the ciphertext_1 206B. Similarly, the encryptor 204 encrypts the plaintext 202A using the public key_2 202C to generate the ciphertext_2 206C. The ciphertext_1 206B and the ciphertext_2 206C are sent to the server 208. The server 208 can be, for example, AS_0 130, AS_1 131, or AS_2 132 (FIG. 1).

The server 208 sends the ciphertext_1 206B to the user_1 111 and sends the ciphertext_2 206C to the user_2 112. The decryptor_1 231 receives the ciphertext_1 206B from the server 208 and receives the private key_1 221 from the user_1 111. Using the private key_1 221, the decryptor_1 231 decrypts the ciphertext_1 206B to recover the plaintext 202A. Similarly, the decryptor_2 232 receives the ciphertext_2 206C from the server 208 and receives the private key_2 222 from the user_2 112. Using the private key_2 222, the decryptor_2 232 decrypts the ciphertext_2 206C to recover the plaintext 202A.

A major disadvantage of the conventional encryption-decryption system is the need to maintain lists of recipients and their public keys. The lists can be long and dynamically changing; for example, lists of members of a professional society with greater than ten thousand members or lists of employees of a corporation with more than one hundred thousand employees. The target recipients, furthermore, often are not necessarily specific individuals, but individuals that fulfill specific roles; for example, tenured faculty in universities, executive officers in corporations, and technicians in a service shop. The specific individuals that fulfill these specific roles can change dynamically.

A more flexible encryption-decryption system is an attribute-based encryption (ABE) system, which is a particular type of a more general functional encryption system. ABE systems are discussed first; more general functional encryption systems are discussed later. Potential recipients are identified based on attributes (also referred to as credentials). Attributes are generic parameters. Common attributes include physical characteristics such as sex, age, height, and weight; other common attributes include residence, occupation, education, income, and membership in specific groups or organizations.

Other attributes are specific to a particular setting. In a university setting, for example, attributes can include status such as faculty, student, or administrative staff. Each group can have finer-grained attributes; for example, faculty can be tenured or non-tenured, and students can be undergraduate students or graduate students. In a corporate setting, for example, attributes can include organization such as research, development, manufacturing, marketing, and sales. Examples of finer-grained attributes for the research organization include department (such as physics, chemistry, or mathematics) and rank (such as member of technical staff, technical manager, or department head).

The above examples of attributes are characteristics of users. Attributes can also be time-based or event-based. As an example of a time-based attribute, a meeting notice can contain the attributes ("recipients=faculty" AND "day=first Monday of every month"). As an example of an event-based attribute, a stock transaction can contain the attributes ("recipient=financial advisor at ABC Stock Brokers" AND "stock price of Company XYZ exceeds $100").

The sender of a message can create a policy that specifies the recipients that can decrypt an encrypted message. The policy can be flexible and adaptive by specifying Boolean combinations of attributes that a recipient must satisfy in order to decrypt the encrypted message. In a university setting, for example, a policy can specify that the target recipients must satisfy the attributes of (status=faculty OR graduate student). In a corporate setting, for example, a policy can specify that the target recipients must satisfy the attributes of ((organization=research) OR ((organization=marketing) AND (rank greater than or equal to department head))).

Two distinct varieties of attribute-based encryption (ABE) are considered: ciphertext-policy ABE (CP-ABE) and key-policy ABE (KP-ABE). A combination of CP-ABE and KP-ABE can also be used. In CP-ABE, an access structure (also called a policy) is embedded into the ciphertext during encryption, and an attribute set S is embedded into the decryption key. In KP-ABE this relationship is inverted: an attribute set S is embedded into the ciphertext, and a policy is embedded into the decryption key. CP-ABE is often suggested as a mechanism to implement role-based access control, in which the user's key attributes correspond to the long-term roles, and ciphertexts carry an access policy. KP-ABE is more appropriate in applications in which ciphertexts can be tagged with attributes (for example, relating to message content), and each user's access to these ciphertexts is determined by a policy in his decryption key.

Figure 3:
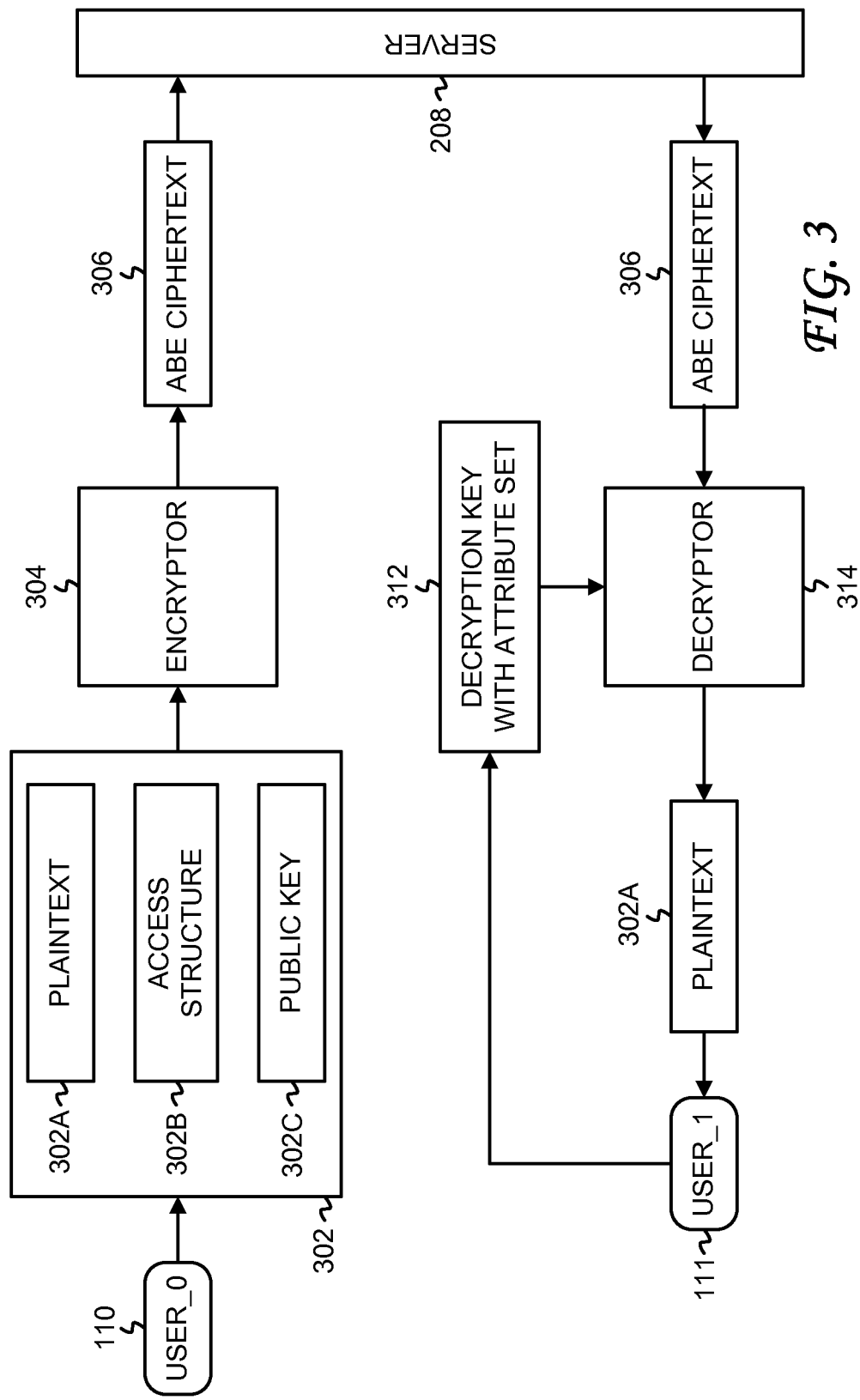
FIG. 3 shows a high-level schematic of a ciphertext-policy attribute-based encryption system.

FIG. 3 shows a high-level schematic of a CP-ABE scheme. The user_0 110 inputs the input 302, which includes the plaintext 302A, the access structure 302B, and the public key 302C. The public key 302C is typically issued to the user by an authority. Typically, a master authority administers the complete encryption/decryption message system and issues a single public key to all users in the system (that is, all users get the same public key). The input 302 is inputted into the encryptor 304, which generates the ABE ciphertext 306. The access structure 302B is embedded into the ABE ciphertext 306 during encryption. The ABE ciphertext 306 is sent to the server 208.

The server 208 sends the ABE ciphertext 306 to the recipients. To simplify the figure, one recipient, user_1 111, is shown. The decryptor 314 receives the ABE ciphertext 306 from the server 208 and the decryption key 312 from the user_1 111. The decryption key 312 is typically issued to the user by an authority (in particular, a master authority). The decryption key is different for each user in the system. The attribute set for user_1 111 is embedded into the decryption key 312. Using the decryption key 312, the decryptor 314 decrypts the ABE ciphertext 306 and recovers the plaintext 302A. The decryption is successful if the decryption key 312 contains the proper attribute set; otherwise, the decryption fails, and the plaintext is not recovered.

Figure 4:
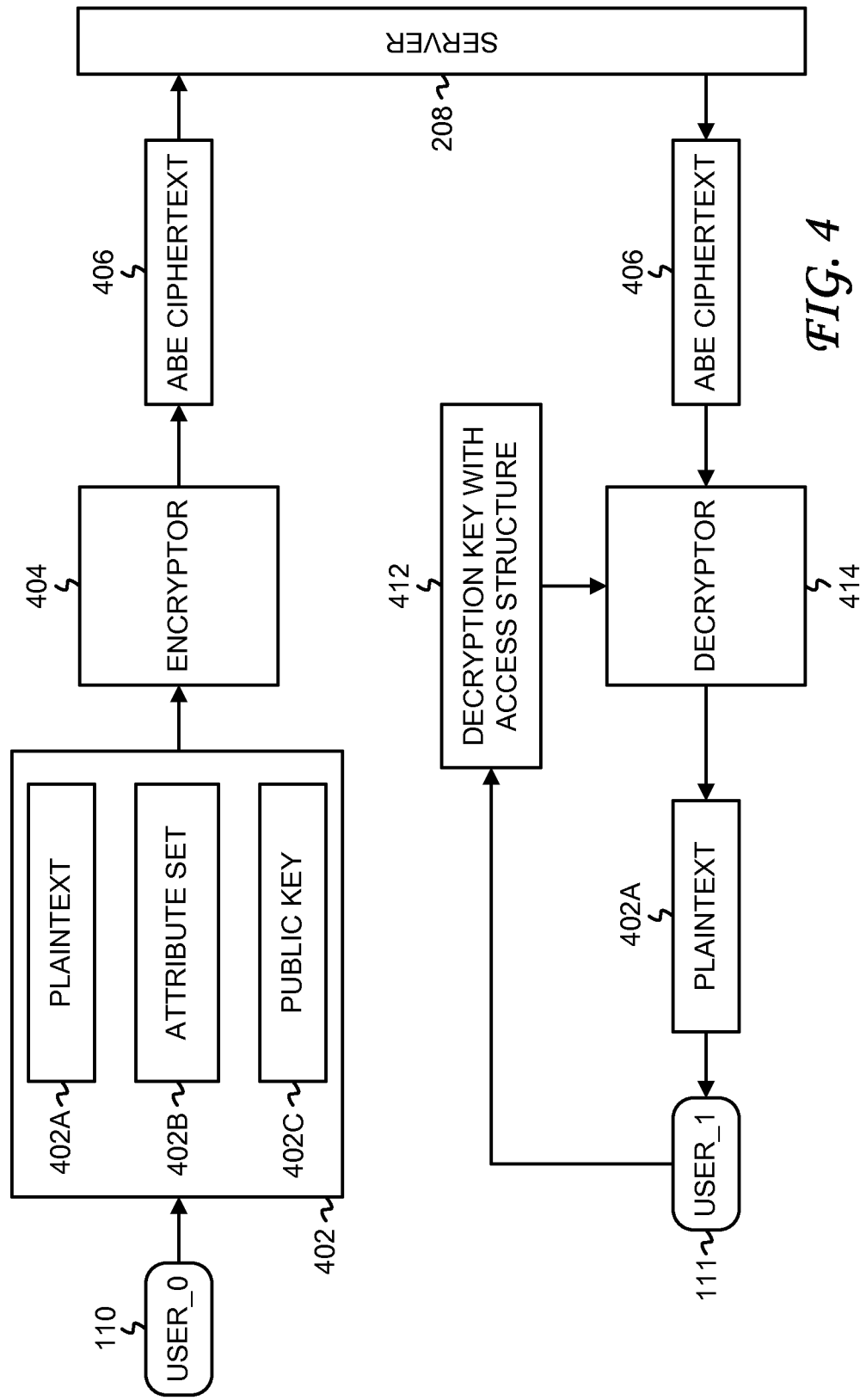
FIG. 4 shows a high-level schematic of a key-policy attribute-based encryption system.

FIG. 4 shows a high-level schematic of a KP-ABE scheme. The user_0 110 inputs the input 402, which includes the plaintext 402A, the attribute set 402B, and the public key 402C. As in the CP-ABE scheme described above, typically a master authority issues a single public key to all users in the system. The input 402 is inputted into the encryptor 404, which generates the ABE ciphertext 406. The attribute set 402B is embedded into the ABE ciphertext 406 during encryption. The ABE ciphertext 406 is sent to the server 208.

The server 208 sends the ABE ciphertext 406 to the recipients. To simplify the figure, one recipient, user_1 111, is shown. The decryptor 414 receives the ABE ciphertext 406 from the server 208 and the decryption key 412 from the user_1 111. As in the CP-ABE scheme described above, the decryption key 412 is typically issued to the user by an authority (in particular, a master authority); each user in the system is issued a different decryption key. The access structure for user_1 111 is embedded into the decryption key 412. Using the decryption key 412, the decryptor 414 decrypts the ABE ciphertext 406 and recovers the plaintext 402A. The decryption is successful if the decryption key 412 contains the proper access structure; otherwise, the decryption fails, and the plaintext is not recovered.

Figure 5:
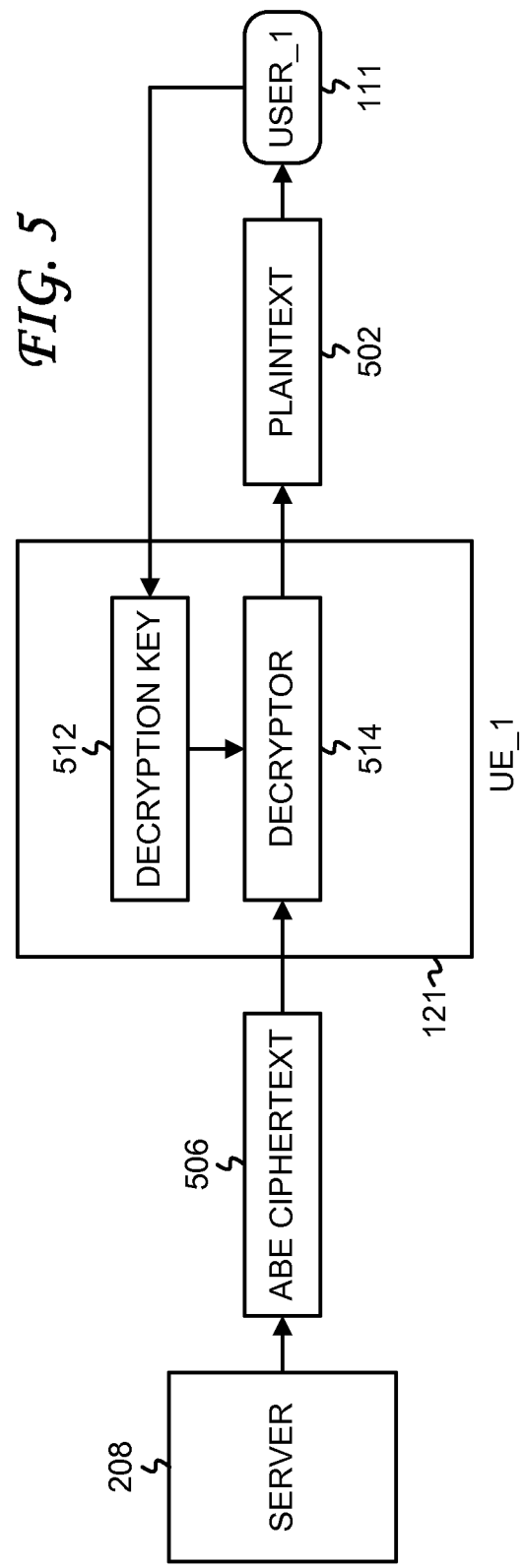
FIG. 5 shows a high-level schematic of decryption, performed by a user equipment, of an attribute-based encrypted ciphertext.

FIG. 5 shows a high-level schematic of the conventional message flow for receiving and decrypting an ABE ciphertext. In this example, the recipient is user_1 111. The ABE ciphertext 506 is sent from the server 208 to the user equipment UE_1 121. The ABE ciphertext 506 can be a CP-ABE ciphertext, a KP-ABE ciphertext, or a combination of a CP-ABE ciphertext and a KP-ABE ciphertext. The decryptor 514 resides in the UE_1 121. The decryptor 514 is typically implemented as software; however, other implementations such as firmware or dedicated application specific integrated circuits (ASICs) can be used. The decryptor 514 receives the ABE ciphertext 506 from the server 208 and receives the decryption key 512 from the user_1 111. Using the decryption key 512, the decryptor 514 decrypts the ABE ciphertext 506 and recovers the plaintext 502. The decryption key 512 is typically issued to the user by an authority (in particular, a master authority).

As discussed above, ABE can flexibly and adaptively accommodate large sets of attributes and complex policies based on attributes. The size of the ABE ciphertext and the time required to decrypt it, however, grows with the complexity of the access formula.

Referring to FIG. 5, if the user equipment UE_1 121 is a desktop personal computer or a laptop computer, the user equipment typically has sufficient computational resources to decrypt the ABE ciphertext rapidly. If the user equipment is a smartphone, or other user equipment with constrained computational resources, however, decrypting the ABE ciphertext can be unacceptably slow; for example, the decryption time on a smartphone can be two orders of magnitude longer than the decryption time on a PC or laptop.

In an embodiment of the invention, decryption of ABE ciphertext is "outsourced" to a proxy with more powerful computational resources than the user equipment; in particular, the proxy can be an applications server for a cloud-computing service. In a trivial implementation of outsourcing, a user provides the cloud-computing service provider with his decryption key. A security risk arises, however, since the cloud-computing service provider can fully decrypt the user's confidential messages.

Figure 6:
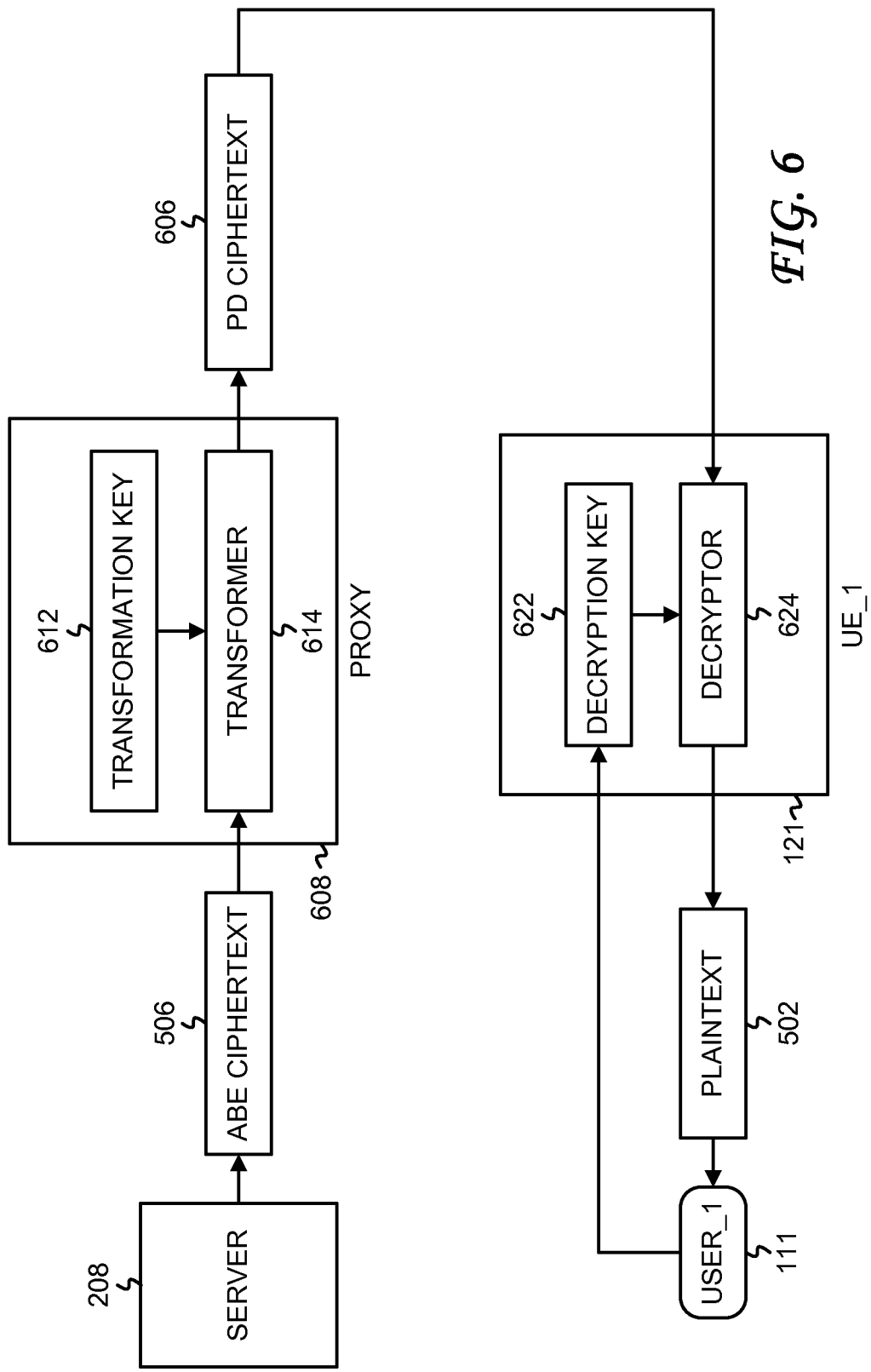
FIG. 6 shows a high-level schematic of outsourcing of the decryption of an attribute-based encrypted ciphertext.

In an embodiment of the invention, shown schematically in FIG. 6, decryption of ABE ciphertext is outsourced to a proxy without revealing the user's decryption key to the operator of the proxy. The server 208 sends the ABE ciphertext 506 to the proxy 608. The proxy 608 can be an applications server, such as AS_0 130, AS_1 131, or AS_2 132 (FIG. 1). In some embodiments, the server 208 and the proxy 608 are the same applications server.

Using the transformation key 612, the transformer 614 transforms the ABE ciphertext 506 into the partially-decrypted (PD) ciphertext 606. More details of the transformation key, the transformer, and the PD ciphertext are discussed below. The PD ciphertext 606 is then sent to the user equipment UE_1 121. The decryptor 624 receives the PD ciphertext 606 from the proxy 608 and the decryption key 622 from the user_1 111. Using the decryption key 622, the decryptor 624 decrypts the PD ciphertext 606 and recovers the plaintext 502. Herein, "the decryption key" is also referred to as "the private key" and also referred to as "the secret key".

In the embodiment shown in FIG. 6, the transformation process is executed on a single proxy. In general, the transformation process includes multiple steps, and the steps can be executed on multiple proxies. For example, a ciphertext can be received by a first proxy, which transforms the ciphertext into a first PD ciphertext, which is sent to a second proxy. The first PD ciphertext is received by the second proxy, which transforms the first PD ciphertext into a second PD ciphertext. The second PD ciphertext, for example, can have a shorter bit length than the first PD ciphertext or can be faster to decrypt than the first PD ciphertext. This process can be repeated by a sequence of proxies. The final proxy in the sequence then sends the final PD ciphertext to a user equipment, which decrypts the final PD ciphertext.

In the embodiment shown in FIG. 6, the PD ciphertext is sent from the proxy to the user equipment. In general, the PD ciphertext can be sent to an intermediate server (such as an e-mail server or a file server) and from the intermediate server to the user equipment.

As discussed further below, attribute-based encryption is a particular instance of functional encryption. Herein, an input functional encryption ciphertext is transformed into an output partially-decrypted ciphertext. The output partially-decrypted ciphertext satisfies at least one of the following conditions:

(a) the bit length of the output partially-decrypted ciphertext is shorter than the bit length of the input functional encryption ciphertext; or (b) the decrypt time for the output partially-decrypted ciphertext is less than the decrypt time for the input functional encryption ciphertext (decrypt times are compared on the same system or device, such as the same user equipment).

The "or" is non-exclusive: for some partially-decrypted ciphertexts, the bit length of the output partially-decrypted ciphertext is shorter than the bit length of the input functional encryption ciphertext, and the decrypt time of the output partially-decrypted ciphertext is less than the decrypt time of the input functional encryption ciphertext. In some embodiments, the output partially-decrypted ciphertext is itself a functional encryption ciphertext; for example, the output partially-decrypted ciphertext can be a functional encryption ciphertext that is less complex than the input functional encryption ciphertext. To simplify the terminology herein, a "functional encryption ciphertext" refers to a functional encryption ciphertext that has never been partially decrypted.

In embodiments described below, the functional encryption is an attribute-based encryption (ABE). An input ABE ciphertext is transformed into an output partially-decrypted (PD) ciphertext. The output PD ciphertext satisfies at least one of the following conditions:

(a) the bit length of the output PD ciphertext is shorter than the bit length of the input ABE ciphertext; or (b) the decrypt time for the output PD ciphertext is less than the decrypt time for the input ABE ciphertext (decrypt times are compared on the same system or device, such as the same user equipment).

The "or" is non-exclusive: for some PD ciphertexts, the bit length of the output PD ciphertext is shorter than the bit length of the input ABE ciphertext, and the decrypt time of the output PD ciphertext is less than the decrypt time of the input ABE ciphertext. In some embodiments, the output PD ciphertext is itself an ABE ciphertext; for example, the output PD ciphertext can be an ABE ciphertext that is less complex than the input ABE ciphertext. One example of a PD ciphertext is an El Gamal type ciphertext [Taher El Gamal. A public key cryptosystem and a signature scheme based on discrete logarithms. In CRYPTO, pages 10-18, 1984.] To simplify the terminology herein, an "ABE ciphertext" refers to an ABE ciphertext that has never been partially decrypted.

In the outsourcing system shown in FIG. 6, two keys are used: a transformation key and a decryption key. Examples of entities and processes for generating these keys are described in the high-level schematics of FIG. 7A-FIG. 7G. Security systems are administered by an administrative entity referred to as an authority. In an ABE security system, there is typically a single authority, referred to as the master authority. An ABE security system, however, can also have multiple authorities, as described in U.S. application Ser. No. 13/352, 735, filed Jan. 18, 2012, which is herein incorporated by reference. To simplify the discussion, a single master authority (referenced as the master authority 702) is designated in the examples below. The processing by the master authority is implemented on the master authority server 708, which can, for example, be an applications server, such as AS_0 130, AS_1 131, or AS_2 132 (FIG. 1).

Refer to FIG. 7A. The master authority 702 inputs the input 710 into the setup processor 712. The input 710 includes the security parameter $\lambda$ and the attribute universe. The attribute universe refers to the set of all attributes recognized by the master authority 702. The security parameter is an integer $\lambda$. In general, the higher the security parameter is set, the more computational effort it will take for an attacker to break the scheme. In a secure scheme for each attack algorithm, the computational effort to break it should be a "super-polynomial" function $f(\lambda)$. $f(\lambda)$ is a superpolynomial if there is no polynomial that dominates $f(\lambda)$; that is, there is no polynomial $p(\lambda)$ where $f(\lambda)=O(p(\lambda))$. An example of a superpolynomial function is $f(\lambda)=2^\lambda$. The choice of security parameter also effects system performance: algorithms become more expensive as $\lambda$ increases. In practice, $\lambda$ is chosen such that it is infeasible for an attacker to break the scheme, yet the algorithms run in a reasonable amount of time.

The setup processor 712 receives the input 712 and outputs the output 714, which includes the master key (also referred to as the master secret key) and the public key (also referred to as the public parameters). The public key is used to encrypt plaintext into ciphertext.

Refer to FIG. 7B, which applies to a CP-ABE system. The master authority 702 inputs the input 720 into the outsourcing key generator 722. The input 720 includes the master key and the attribute set to be embedded in the output keys. The outsourcing key generator 722 receives the input 720 and outputs the output 724, which includes the secret key and the transformation key. The secret key (which, as discussed above, is also referred to as the private key and is also referred to as the decryption key) is sent to a user. The transformation key is sent to a proxy administrator.

Refer to FIG. 7C, which applies to a KP-ABE system. The master authority 702 inputs the input 730 into the outsourcing key generator 732. The input 730 includes the master key and the access policy (also referred to as the access structure) to be embedded in the output keys. The outsourcing key generator 732 receives the input 730 and outputs the output 734, which includes the secret key and the transformation key. The secret key is sent to a user. The transformation key is sent to a proxy administrator.

In some embodiments, the transformation key is supplied by a user instead of the master authority. The key generation processes for the secret key and the transformation key are then shown in FIG. 7D-FIG. 7G.

Refer to FIG. 7D, which applies to a CP-ABE system. The master authority 702 inputs the input 740 into the key generator 742. The input 740 includes the master key and the attribute set to be embedded in the output key. The key generator 742 receives the input 740 and outputs the output 744, which includes the secret key. The secret key is sent to a user.

Refer to FIG. 7C, which applies to a KP-ABE system. The master authority 702 inputs the input 750 into the key generator 752. The input 750 includes the master key and the access policy to be embedded in the output key. The key generator 752 receives the input 750 and outputs the output 754, which includes the secret key. The secret key is sent to a user.

In FIG. 7F and FIG. 7G, a user generates a transformation key in a user equipment. In the examples, the user is user_1 111, and the user equipment is UE_1 121.

Refer to FIG. 7F, which applies to a CP-ABE system. The user_1 111 inputs the input 760 into the outsourcing key generator 762. The input 760 includes the secret key (previously received from the master authority 702) and the attribute set to be embedded in the output key. The outsourcing key generator 762 receives the input 760 and outputs the output 764, which includes the transformation key. The transformation key is sent to a proxy administrator.

Refer to FIG. 7G, which applies to a KP-ABE system. The user_1 111 inputs the input 770 into the outsourcing key generator 772. The input 770 includes the secret key (previously received from the master authority 702) and the access policy to be embedded in the output key. The outsourcing key generator 772 receives the input 770 and outputs the output 774, which includes the transformation key. The transformation key is sent to a proxy administrator.

Refer back to FIG. 6. In some embodiments, the server 208 is a file server, and the user_1 111 retrieves a file from the server 208. The user_1 111 requests the file to be sent as a PD ciphertext, and the decryption follows the process shown in FIG. 6. In other embodiments, however, the server 208 can send various types of ciphertext to the user_1 111. The server 208, for example, can be a mail server.

Figure 16:
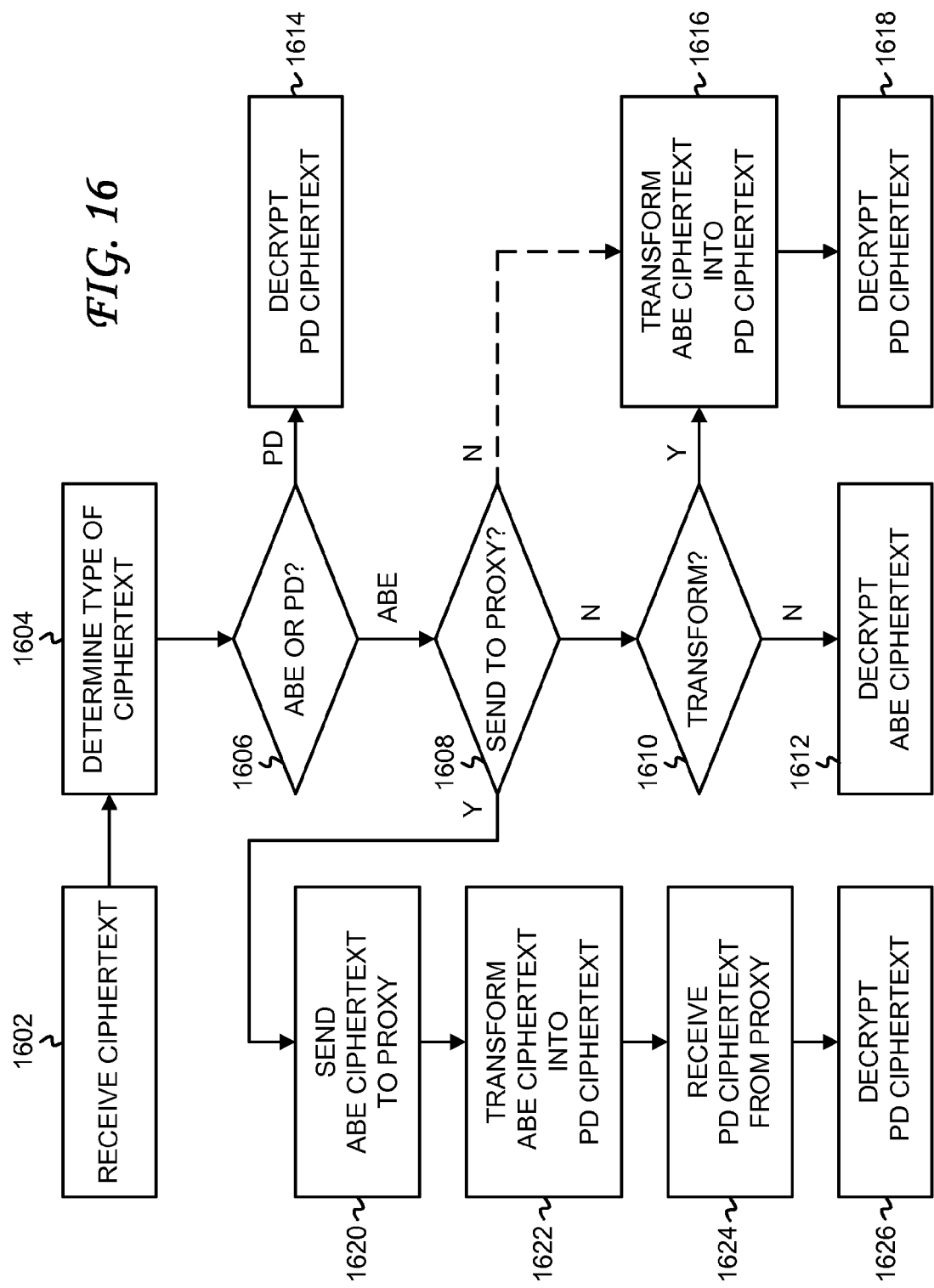
FIG. 16 shows a high-level flowchart of a general method for decrypting attribute-based encryption ciphertexts and partially-decrypted ciphertexts.

In some embodiments, the server 208 sends all ABE ciphertexts to the proxy 608, which transforms the ABE ciphertexts into PD ciphertexts. The user_111 receives only PD ciphertexts, and the decryption follows the process shown in FIG. 6. In general, however, the user_1 111 can receive both ABE ciphertexts and PD ciphertexts. The decryption process then is more complex, as shown in the flowchart of FIG. 16.

In step 1602, the user equipment (such as UE_1 121 in FIG. 6) receives a ciphertext. The process then passes to step 1604, in which the user equipment determines the type of ciphertext (ABE or PD) that was received. The process then passes to the branching step 1606. If the received ciphertext is a PD ciphertext, then the process passes to step 1614, in which the user equipment decrypts the PD ciphertext. If the received ciphertext is an ABE ciphertext, then the process passes to the decision step 1608, in which the decision whether or not to send the ABE ciphertext to a proxy is made. If the ABE ciphertext is complex, or if the computational resources of the user equipment are limited, for example, then it can be appropriate to send the ABE ciphertext to a proxy for further processing. If the ABE ciphertext is simple, or if the computational resources of the user equipment are substantial, for example, then it can be appropriate for the user equipment to process the ABE ciphertext.

If the decision is made to send the ABE ciphertext to a proxy, then the process passes from step 1608 to step 1620, in which the ABE ciphertext is sent to a proxy (such as the proxy 608 in FIG. 6). The process then passes to step 1622, in which the proxy transforms the ABE ciphertext into PD ciphertext. The process then passes to step 1624, in which the user equipment receives the PD ciphertext from the proxy. The process then passes to step 1626, in which the user equipment decrypts the PD ciphertext.

Return to the decision step 1608. If the decision is made not to send the ABE ciphertext to a proxy, then the ABE ciphertext is processed by the user equipment. In some embodiments, the user equipment has only a single decryptor configured to decrypt PD ciphertext. In these embodiments, the process passes from step 1608 to step 1616 (as indicated by the dashed line in FIG. 16), in which the user equipment first transforms the ABE ciphertext into PD ciphertext. The process then passes to step 1618, in which the user equipment decrypts the PD ciphertext.

In other embodiments, the user equipment has two decryptors, a conventional ABE decryptor for decrypting ABE ciphertexts and a PD decryptor for decrypting PD ciphertexts. In these embodiments, the process passes from the decision step 1608 to the decision step 1610 (as indicated by the solid line in FIG. 16), in which the decision whether to transform the ABE ciphertext is made. The decision is based, for example, on the complexity of the ABE ciphertext and the computational resources of the user equipment. If the decision not to transform the ABE ciphertext is made, then the process passes from step 1610 to step 1612, in which the user equipment decrypts the ABE ciphertext. If the decision to transform the ABE ciphertext is made, then the process passes from step 1610 to step 1616, in which the user equipment transforms the ABE ciphertext into PD ciphertext. The process then passes to step 1618, in which the user equipment decrypts the PD ciphertext.

The above discussion described, on a high level, embodiments of methods for outsourcing decryption of ABE ciphertext. Detailed mathematical algorithms for embodiments of methods for outsourcing decryption of ABE ciphertext are now presented. The algorithms described below include algorithms for user equipment to transform ABE ciphertext into PD ciphertext (corresponding to step 1616 in FIG. 16).

An "access structure" is formally defined as follows. Let $\{P_1, P_2, \ldots, P_n\}$ be a set of parties. An access structure is a collection X of non-empty subsets of $\{P_1, P_2, \ldots, P_n\}$, that is, $X \subseteq 2^{\{P_1, P_2, \ldots, P_n\}} \setminus \{\emptyset\}$. The sets in X are called the "authorized sets", and the sets not in X are called the "unauthorized sets". A collection $X \subseteq 2^{\{P_1, P_2, \ldots, P_n\}}$ is monotone if for all Y, Z: if $Y \in X$ and $Y \subseteq Z$ then $Z \in X$. An access structure is a monotone access structure if X is a monotone collection.

In the context of the algorithms described below, the role of the parties is taken by the attributes. The access structure, therefore, will contain the authorized sets of attributes. The examples discussed below involve monotone access structures. General access structures, however, can be implemented by defining the "not" of an attribute as a separate attribute altogether; the number of attributes in the system will then be doubled. To simplify the terminology in the examples discussed below, unless stated otherwise, an access structure refers to a monotone access structure.

Let S represent a set of attributes, and A represent an access structure. For generality, $(I_{enc}, I_{key})$ are defined as the inputs to the encryption function and the key generation function, respectively. In a CP-ABE scheme, $(I_{enc}, I_{key})=(A, S)$. In a KP-ABE scheme, $(I_{enc}, I_{key})=(S, A)$.

Figure 8:
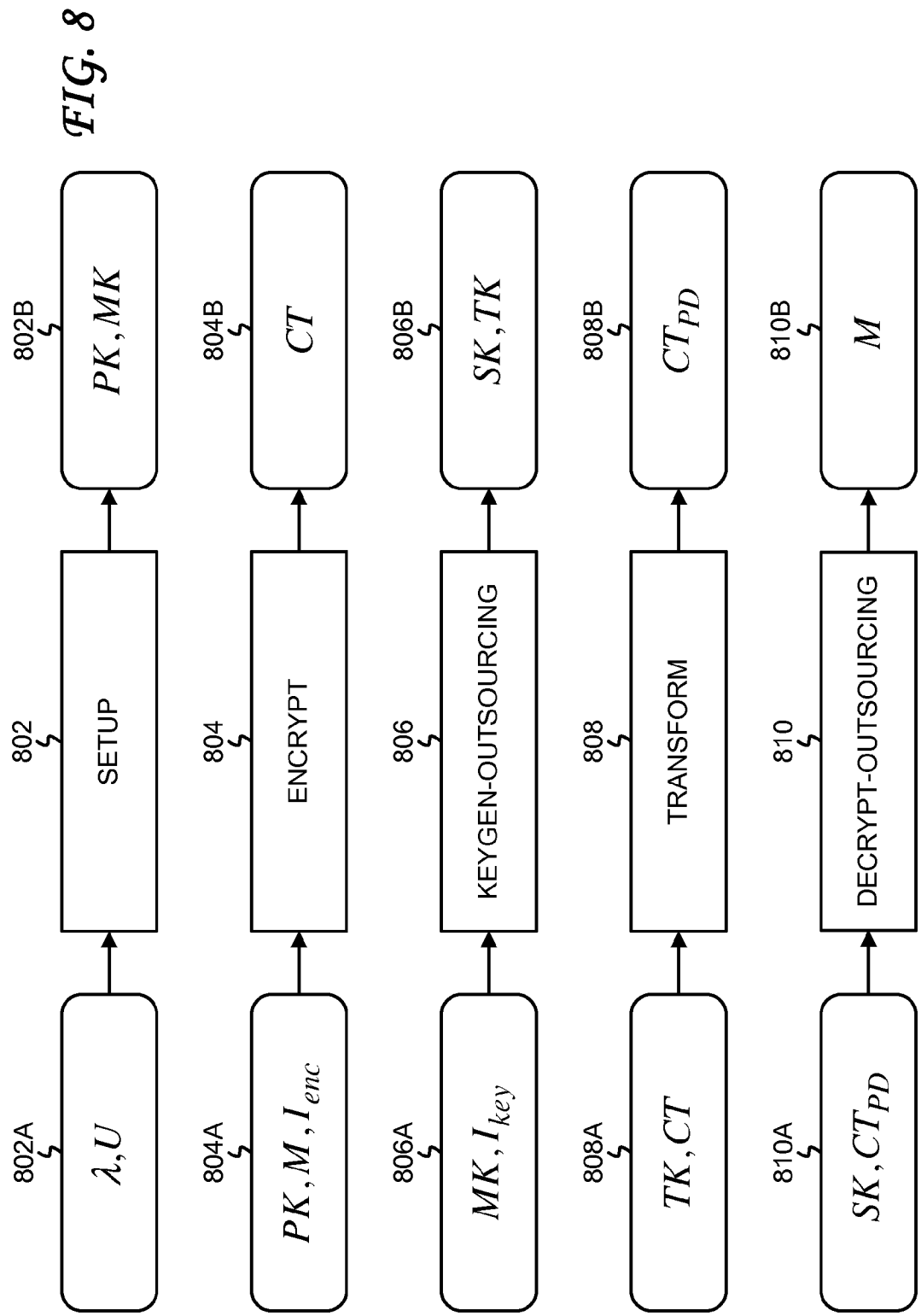
FIG. 8 shows a high-level flowchart of a first embodiment of a method for outsourcing decryption of attribute-based encrypted ciphertexts.

In an embodiment, an ABE (CP-ABE or KP-ABE) scheme with outsourcing functionality includes the algorithms shown in the high-level schematics of FIG. 8. The algorithms include setup, encrypt, key generation, transformation, and decryption. Details of each algorithm are given below.

Algorithm 802. Setup($\lambda$,U).

The setup algorithm 802 receives the input 802A and outputs the output 802B. The input 802A includes a security parameter $\lambda$, previously discussed, and an attribute universe description U, describing the attributes that can be used in the system. The output 802B includes the public parameters (as referred to as the public key) PK and the master key (also referred to as the master secret key) MK.

Algorithm 804. Encrypt(PK, M, $I_{enc}$).

The encryption algorithm 804 receives the input 804A and outputs the output 804B. The input 804A includes public parameters PK, a message M, and $I_{enc}$. $I_{enc}$ is an input to the encryption function that corresponds to an access structure for CP-ABE and that corresponds to an attribute set for KP-ABE. The output 804B is the ABE ciphertext CT.

Algorithm 806. KeyGen-Outsourcing(MK, $I_{key}$).

The key-generation-outsourcing algorithm 806 receives the input 806A and outputs the output 806B. The input 806A includes a master key MK and $I_{key}$. $I_{key}$ is an input to the key generation function that corresponds to an attribute set for CP-ABE and that corresponds to an access structure for KP-ABE. The output 806B includes the secret key (also referred to as the private key and also referred to as the decryption key) SK and the transformation key TK.

Algorithm 808. Transform(TK, CT).

The ciphertext transformation algorithm 808 receives the input 808A and outputs the output 808B. The input 808A includes a transformation key TK and an ABE ciphertext CT. The output 808B is the partially-decrypted (PD) ciphertext $CT_{PD}$ if S∈A and an error symbol otherwise.

Algorithm 810. Decrypt-Outsourcing(SK, $CT_{PD}$).

The decryption-outsourcing algorithm 810 receives the input 810A and outputs the output 810B. The input 810A includes a secret key SK and a partially-decrypted ciphertext $CT_{PD}$. The output 810B is the message M if S∈A and an error symbol otherwise.

The algorithms can handle decryption of both ABE ciphertext and PD ciphertext received by the user. If the received ciphertext is PD ciphertext, the Decrypt-Outsourcing algorithm is run. If the received ciphertext is ABE ciphertext, the ABE ciphertext is first transformed into PD ciphertext by running the Transform algorithm; the Transform algorithm can be run by the holder of the decryption key. The Decrypt-Outsourcing algorithm is then run on the resulting PD ciphertext.

In order to be secure, a system must be collusion resistant. Suppose users $u_1, u_2, \ldots, u_n$ have respective private keys $k_1, k_2, \ldots k_n$. Furthermore, suppose that none of the private keys individually is capable of decrypting a ciphertext C. Then the set of users should still not be able to decrypt C even if they collude and combine all of their key material. For example, a user with attributes "male" and "professor" and a user with attributes "female" and "lawyer" should not be able to collude to decrypt a ciphertext encrypted with the access policy ("female" AND "professor"). Embodiments of ABE outsourcing schemes described herein are collusion resistant.

A security model for ABE that supports outsourcing is now described. A very strong notion of security is desired. The traditional notion of security against adaptive chosen-ciphertext attacks (CCA) is too strong since it does not allow any bit of the ciphertext to be altered, and the purpose of outsourcing algorithms discussed below is to compress the size of the ciphertext. A relaxed notion of security due to Canetti, Krawczyk and Nielsen [Ran Canetti, Hugo Krawczyk, and Jesper Buus Nielsen. Relaxing chosen-ciphertext security. In CRYPTO, pages 565-582, 2003] called replayable CCA (RCCA) security is adopted and adapted to the algorithms discussed below. Replayable CCA allows modifications to the ciphertext provided they cannot change the underlying message in a meaningful way.

A method for evaluating security is constructed as a security game. A generalized RCCA security game for both CP-ABE and KP-ABE schemes with outsourcing is now described. For CP-ABE, the function $f(I_{key}, I_{enc})$ is defined as $f(S, A)$. For KP-ABE, $f(I_{key}, I_{enc})$ is defined as $f(A, S)$. In either case, the function $f$ evaluates to one if and only if S∈A. The "advantage" of an adversary in this game is defined as the probability that it "wins" the game minus 0.5. That is, the probability that the bit guessed by the adversary during the Guess phase is equal to the random bit selected by the challenger during the Challenge phase, minus 0.5, where this constant is the probability of guessing a random bit with no other information. An adversary's advantage is "negligible" if it is smaller than any inverse polynomial, meaning that when the game is played with security parameter λ, for every polynomial poly(•) there exists a N such that for all integers λ>N it holds that the adversary's advantage is less than $$\frac{1}{poly(\lambda)}.$$

Figure 9:
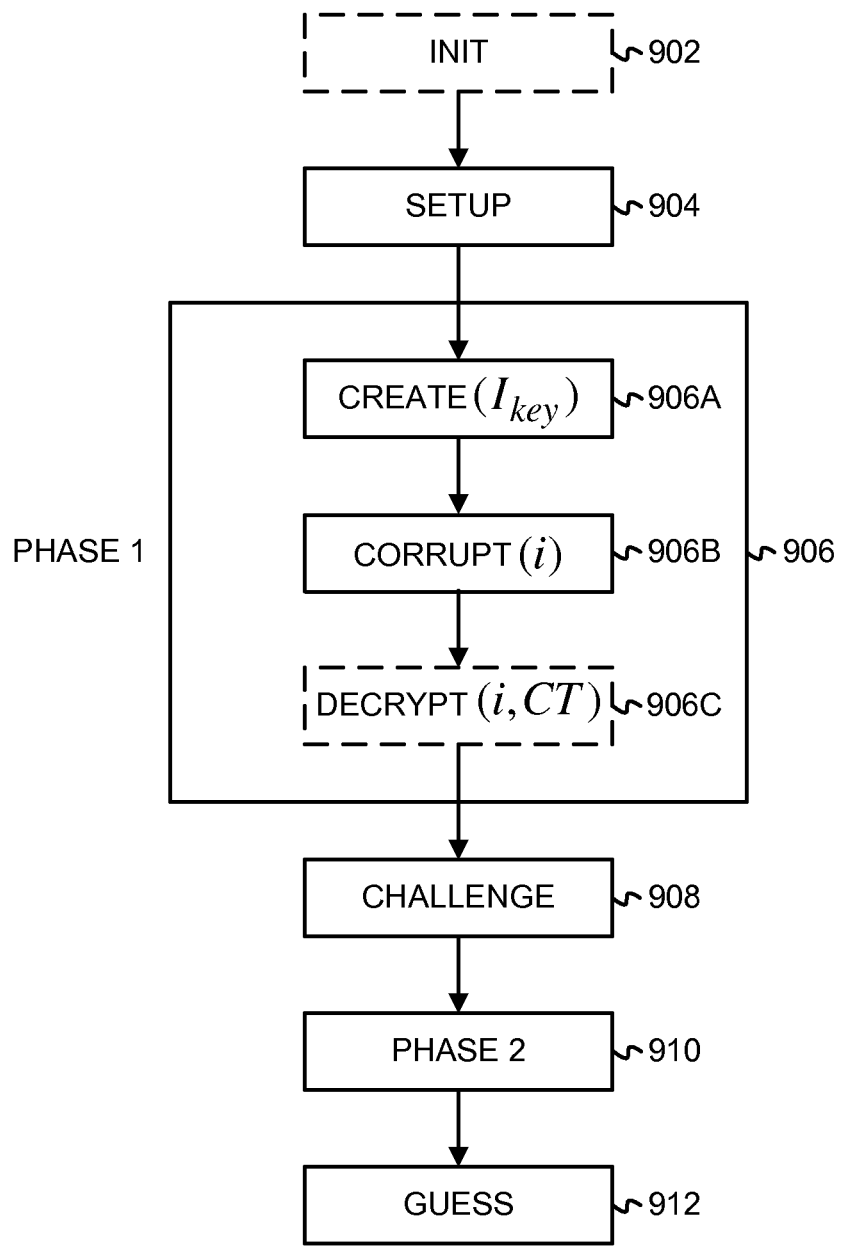
FIG. 9 shows a high-level flowchart of a method for evaluating the security of an attribute-based encryption system.

The game proceeds according to the sequence of algorithms shown in the high-level flowchart of FIG. 9. The game starts at step 904 (Setup), passes to step 906 (Phase 1), passes to step 908 (Challenge), passes to step 910 (Phase 2), and then passes to step 912 (Guess). Details of each algorithm are given below. The optional step 902 is discussed below.

Step 904. Setup.

The challenger runs the Setup algorithm and gives the public parameters, PK, to the adversary.

Step 906. Phase 1.

The challenger initializes an empty table T, an empty set D, and an integer j=0. Proceeding adaptively, the adversary can repeatedly make any of the following queries:

Step 906A. Create($I_{key}$): The challenger sets j:=j+1. It runs the outsourced key generation algorithm on $I_{key}$ to obtain the pair (SK, TK) and stores in table T the entry (j, $I_{key}$, SK, TK). It then returns to the adversary the transformation key TK. Note: Create can be repeatedly queried with the same input.

Step 906B. Corrupt(i): If there exists an $i^{th}$ entry in table T, then the challenger obtains the entry (i, $I_{key}$, SK, TK) and sets D:=D∪{$I_{key}$}. It then returns to the adversary the private key SK. If no such entry exists, then it returns an error message.

Step 906C. Decrypt(i, CT): If there exists an $i^{th}$ entry in table T, then the challenger obtains the entry (i, $I_{key}$, SK, TK) and returns to the adversary the output of the decryption algorithm on input (SK, CT). If no such entry exists, then it returns an error message.

Step 908. Challenge.

The adversary submits two equal-length messages $M_0$ and $M_1$. In addition, the adversary gives a value $I_{enc}^*$ such that for all $I_{key}$∈D, $f(I_{key}, I_{enc}^*) \neq 1$. The challenger chooses a random bit $b_{rand}$ (which is either zero or one), and encrypts $M_{b_{rand}}$ under $I^*_{enc}$. The resulting ciphertext CT* is given to the adversary.

Step 910. Phase 2.

Phase 1 is repeated with the restrictions that the adversary cannot:

Trivially obtain a private key for the challenge ciphertext. [That is, it cannot issue a Corrupt query that would result in a value $I_{key}$ which satisfies $f(I_{key}, I_{enc}^*)=1$ being added to D.]

Issue a trivial decryption query. [That is, Decrypt queries will be answered as in Phase 1, except that if the response would be either $M_0$ or $M_1$, then the challenger responds with the special message "test" instead.]

Step 912. Guess.

The adversary outputs a guess $b_{guess}$ of $b_{rand}$.

An "RCCA-secure ABE with outsourcing" is formally defined as follows. A CP-ABE or KP-ABE scheme with outsourcing is RCCA-secure (or secure against "replayable chosen-ciphertext attacks") if all polynomial time adversaries have at most a negligible advantage in the RCCA game defined above. A system is CPA-secure (or secure against "chosen-plaintext attacks") if the Decrypt oracle is removed in both Phase 1 and 2. The Decrypt oracle in Phase 1 is shown as step 906C. The Decrypt oracle in Phase 2 is not shown.

A CP-ABE or KP-ABE scheme is "selectively secure" if an Initialization (Init) stage is added before Setup in the security game. In the Init stage, shown as step 902 in FIG. 9, the adversary commits to the challenge value $I_{enc}*$ by declaring the challenge value $I_{enc}*$ that will be used during the challenge phase; this value cannot be changed later. The Init stage can be added to the CPA-security game to evaluate selectively CPA-secure systems, and the Init stage can be added to the RCCA-security game to evaluate selectively RCCA-secure systems.

Discussion of security algorithms below use the concept of a bilinear map. A "bilinear map" is formally defined as follows. Let $G_1$ and $G_2$ be cyclic groups of prime order p, for which the group operation is denoted as multiplication. Let $g_1$ be a generator of $G_1$, and $g_2$ be a generator of $G_2$. Let $e: G_1 \times G_2 \rightarrow G_T$, which takes one element in $G_1$ and one element in $G_2$ and outputs one element in $G_T$, be a bilinear map with the properties:
1. Bilinearity. For all $u \in G_1$, $v \in G_2$, and a, $b \in \mathbb{Z}_p$: $e(u^a, v^b) = e(u, v)^{ab}$.
2. Non-degeneracy. $e(g_1, g_2) \neq 1$.
3. Efficiently Computable. The mapping e as well as the group operations in $G_1$ and $G_2$ are all efficiently computable.

Note that $G_1$ and $G_2$ are not necessarily distinct groups. The order of these groups might also be composite. Embodiments of outsourcing techniques described herein can be applied in any of these types of bilinear groups as well as other algebraic settings, such as RSA (Rivest, Shamir, and Adleman), discrete logarithm, elliptic curve, lattices, knapsacks, or multivariate settings. Embodiments of outsourcing techniques described herein are provably secure under the Decisional Parallel Bilinear Diffie-Hellman Exponent Assumption and the Decisional Bilinear Diffie-Hellman Assumption (DBDH) in bilinear groups.

Linear secret-sharing schemes are discussed below. A "linear secret-sharing scheme (LSSS)" is formally defined as follows; the definition is adapted from Beimel [Amos Beimel. Secure Schemes for Secret Sharing and Key Distribution. PhD thesis, Israel Institute of Technology, Technion, Haifa, Israel, 1996]. A secret-sharing scheme $\Pi$ over a set of parties is called linear (over $\mathbb{Z}_p$, the integers modulo p) if
1. The shares of the parties form a vector over $\mathbb{Z}_p$.
2. There exists a matrix $\Gamma$ with l rows and n columns called the share-generating matrix for $\Pi$, and there exists a function $\rho$ that maps each row of the matrix to an associated party. That is, for $i=1, \ldots, l$, the value $\rho(i)$ is the party associated with row i. When the column vector $v=(s, r_2, \ldots, r_n)$ is considered, where $s \in \mathbb{Z}_p$ is the secret to be shared, and $r_2, \ldots, r_n \in \mathbb{Z}_p$ are randomly chosen, then $\Gamma v$ is the vector of l shares of the secret s according to $\Pi$. The share $(\Gamma v)_i$ belongs to party $\rho(i)$.

Beimel demonstrated that every linear secret-sharing scheme according to the above definition also enjoys the "linear reconstruction property", which is formally defined as follows. Suppose that $\Pi$ is an LSSS for the access structure A. Let $S \in A$ be any authorized set, and let $I \subset \{1, 2, \ldots, l\}$ be defined as $I = \{i: \rho(i) \in S\}$. Then, there exist constants $\{\omega_i \in \mathbb{Z}_p\}_{i \in I}$ such that, if $\{\lambda_i\}$ are valid shares of any secret s according to $\Pi$, then $$\sum_{i \in I} \omega_i \lambda_i = s.$$

These constants $\{\omega_i\}$ can be found in time polynomial in the size of the share-generating matrix $\Gamma$. Like any secret-sharing scheme, it has the property that for any unauthorized set $s \notin A$, the secret s should be hidden (in particular, information-theoretically hidden) from the parties in S.

In the convention used here, the vector $(1, 0, 0, \ldots, 0)$ is the "target vector" for any linear secret-sharing scheme. For any satisfying set of rows I in $\Gamma$, the target vector is in the span of I. For any unauthorized set of rows I, the target vector is not in the span of the rows of the set I. There will, furthermore, exist a vector w such that $w \cdot (1, 0, 0 \ldots, 0) = -1$ and $w \cdot \Gamma_i = 0$ for all $i \in I$.

Some prior ABE works described access formulas in terms of binary trees. Using standard techniques, any monotonic Boolean formula can be converted into an LSSS representation. An access tree of l nodes will result in an LSSS matrix of l rows.

The CP-ABE construction described herein is based on the "large universe" construction of Waters [Brent Waters. Ciphertext-policy attribute-based encryption: An expressive, efficient, and provably secure realization. In PKC, pages 53-70, 2011], which was proven to be selectively CPA-secure under the Decisional q-parallel Bilinear Diffie-Hellman Exponent Assumption for a challenge matrix of size $l^* \times n^*$, where $l^*, n^* \leq q$. A "large universe" refers to a system that allows for a super-polynomial number of attributes. The Setup, Encrypt and (non-outsourced) Decrypt algorithms are identical to the Waters system. To enable outsourcing, the KeyGen algorithm is modified to output a transformation key. A new Transform algorithm is defined, and the decryption algorithm is modified to handle outputs of Encrypt as well as Transform.

Figure 10:
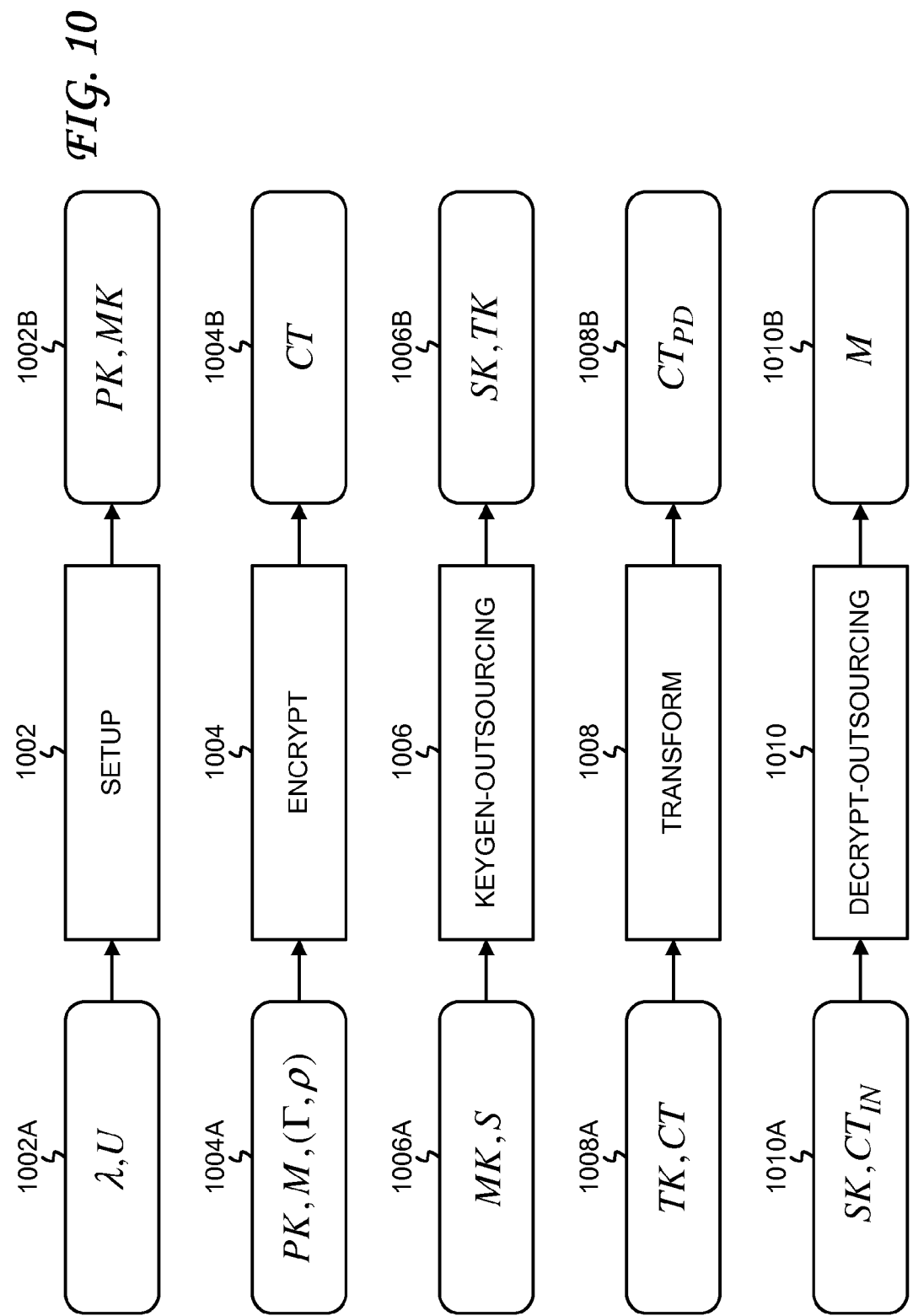
FIG. 10 shows a high-level flowchart of a second embodiment of a method for outsourcing decryption of attribute-based encrypted ciphertexts.

In an embodiment, the outsourcing algorithm includes the algorithms shown in the high-level schematics of FIG. 10. The algorithms include setup, encrypt, key generation, transformation, and decryption. Details of each algorithm are given below.

Algorithm 1002. Setup($\lambda$, U).

The setup algorithm 1002 receives the input 1002A and outputs the output 1002B. The input 1002A includes a security parameter $\lambda$ and an attribute universe description U, describing the attributes that can be used in the system. To cover the most general case, let $U=\{0,1\}^*$, the set of binary strings of any length. The setup algorithm 1002 then chooses a bilinear group G of prime order p, a generator g, and a hash function F that maps binary strings of any length to G. See Waters for details on how to implement this hash in the standard model. F can be considered as a random oracle. To simplify the discussion, the scheme with a bilinear group $G=G_1=G_2$ is described, but the setup algorithm 1002 can also be implemented in groups where $G_1$ and $G_2$ are distinct. In addition, the setup algorithm 1002 chooses random exponents $\alpha, a \in \mathbb{Z}_p$. The output 1002B includes the master secret key MK and the public parameters PK. The master authority (discussed previously) sets $MK=(g^\alpha, PK)$ as the master secret key. It publishes the public parameters as $PK=(g, e(g, g)^\alpha, g^a, F)$.

Algorithm 1004. Encrypt(PK, M, ($\Gamma$, $\rho$)).

The encryption algorithm 1004 receives the input 1004A and outputs the output 1004B. The input 1004A includes public parameters PK, a message M to encrypt, and a LSSS access structure $(\Gamma, \rho)$. The function $\rho$ associates rows of $\Gamma$ to attributes. Let $\Gamma$ be an l×n matrix. The encryption algorithm 1004 first chooses a random vector $\vec{v}=(s, y_2, \ldots, y_n) \in \mathbb{Z}_p^n$. These values will be used to share the encryption exponent s. For i=1 to l, the algorithm calculates $\lambda_i = \vec{v} \cdot \Gamma_i$, where $\Gamma_i$ is the vector corresponding to the ith row of $\Gamma$. In addition, the algorithm chooses random $r_1, \ldots, r_l \in \mathbb{Z}_p$. The output 1004B is the ciphertext CT. The ciphertext CT is published as $$C = M \cdot e(g,g)^{\alpha s}, C' = g^s,$$

$$(C_1 = g^{a\lambda_1} \cdot F(\rho(1))^{-r_1}, D_1 = g^{r_1}), \ldots, (C_l = g^{a\lambda_l} \cdot F(\rho(l))^{-r_l}, D_l = g^{r_l})$$

along with a description of the access structure $(\Gamma, \rho)$.

Algorithm 1006. KeyGen-Outsourcing(MK, S).

The key-generation-outsourcing algorithm 1006 receives the input 1006A and outputs the output 1006B. The input 1006A includes a master secret key MK and an attribute set S. The key-generation-outsourcing algorithm 1006 first runs the Waters KeyGen(MK, S) algorithm. The Waters algorithm chooses a random $t' \in \mathbb{Z}_p$ and then computes $$SK' = (PK, K' = g^\alpha g^{at'}, L' = g^{t'}, \{K'_x = F(x)^{t'}\}_{x \in S})$$

The key-generation-outsourcing 1006 algorithm next chooses a random value $z \in \mathbb{Z}^*_p$. The output 1008B includes the transformation key TK and the private key SK. The key-generation-outsourcing algorithm 1006 sets the transformation key TK as

PK, $$K = K'^{1/z} = g^{(\alpha/z)} g^{a(t'/z)} = g^{(\alpha/z)} g^{at},$$

$$L = L'^{1/z} = g^{(t'/z)} = g^t,$$

$$\{K_x\}_{x \in S} = \{K'^{1/z}_x\}_{x \in S}$$

and the private key SK as (z, TK).

Algorithm 1008. Transform(TK, CT).

The transformation algorithm 1008 receives the input 1008A and outputs the output 1008B. The input 1008A includes a transformation key TK=(PK, K, L, $\{K_x\}_{x \in S}$) for attribute set S and a ciphertext CT=(C, C', $C_1, \ldots, C_l$) for access structure $(\Gamma, \rho)$. If S does not satisfy the access structure, the transformation algorithm 1008 outputs an error message for the output 1008B.

Suppose that S satisfies the access structure, and let $I \subset \{1, 2, \ldots, l\}$ be defined as $I = \{i : \rho(i) \in S\}$. Then, let $\{\omega_i \in \mathbb{Z}_p\}_{i \in I}$ be a set of constants such that if $\{\lambda_i\}$ are valid shares of any secret s according to $\Gamma$, then $$\sum_{i \in I} \omega_i \lambda_i = s.$$

The transformation algorithm 1008 then computes $$e(C', K) \bigg/ \left( e\left(\prod_{i \in I} C_i^{\omega_i}, L\right) \cdot \prod_{i \in I} e(D_i^{\omega_i}, K_{\rho(i)}) \right) =$$

$$e(g, g)^{s\alpha/z} e(g, g)^{ast} \bigg/ \left( \prod_{i \in I} e(g, g)^{ta\lambda_i \omega_i} \right) = e(g, g)^{s\alpha/z}.$$

The output 1008B is the partially-decrypted ciphertext $CT_{PD}$ outputted as $(C, e(g,g)^{s\alpha/z})$.

Algorithm 1010. Decrypt-Outsourcing(SK, $CT_{IN}$).

The decryption-outsourcing algorithm 1010 receives the input 1010A and outputs the output 1010B. The input 1010A includes the private key SK=(z, TK) and the ciphertext $CT_{IN}$, which can be an ABE ciphertext CT or a PD ciphertext $CT_{PD}$. If the ciphertext $CT_{IN}$ is an ABE ciphertext CT, then the decryption-outsourcing algorithm 1010 first executes Transform(TK, CT). If the output of Transform(TK, CT) is an error message, then the decryption-outsourcing algorithm 1010 outputs an error message as well for the output 1010B. Otherwise, the decryption-outsourcing algorithm 1010 parses the ciphertext as $(T_0, T_1)$, where $T_0$ is the first element of the ciphertext and $T_1$ is the second element of the ciphertext, and computes $T_0/T_1^z = M$, which is outputted as the output 1010B. If the ciphertext $CT_{IN}$ is a PD ciphertext $CT_{PD}$, then the decryption-outsourcing algorithm 1010 needs to only compute one exponentiation and no pairings to recover the message M, which is outputted as the output 1010B.

For generality, the transformation key TK was defined as being created by the master authority. Embodiments of the outsourcing method described herein are backwards compatible with existing deployments of the Waters system. In particular, any existing user with his own Waters SK can create a corresponding outsourcing pair (SK', TK') by re-randomizing with a random value Z.

Suppose the large universe construction of Waters is a selectively CPA-secure CP-ABE scheme. Then the CP-ABE scheme described above is a selectively CPA-secure outsourcing scheme. The CPA-secure system can be extended to achieve the stronger RCCA-security guarantee. To do so, some techniques from Fujisaki and Okamoto [Eiichiro Fujisaki and Tatsuaki Okamoto. Secure integration of asymmetric and symmetric encryption schemes. In CRYPTO '99, volume 1666, pages 537-554, 1999] are adapted. They (roughly) showed how to transform a CPA-secure encryption scheme into a CCA-secure encryption scheme in the random oracle model. In the algorithms below, security is relaxed to RCCA-security, and there is the additional challenge of preserving the decryption outsourcing capability.

Figure 11:
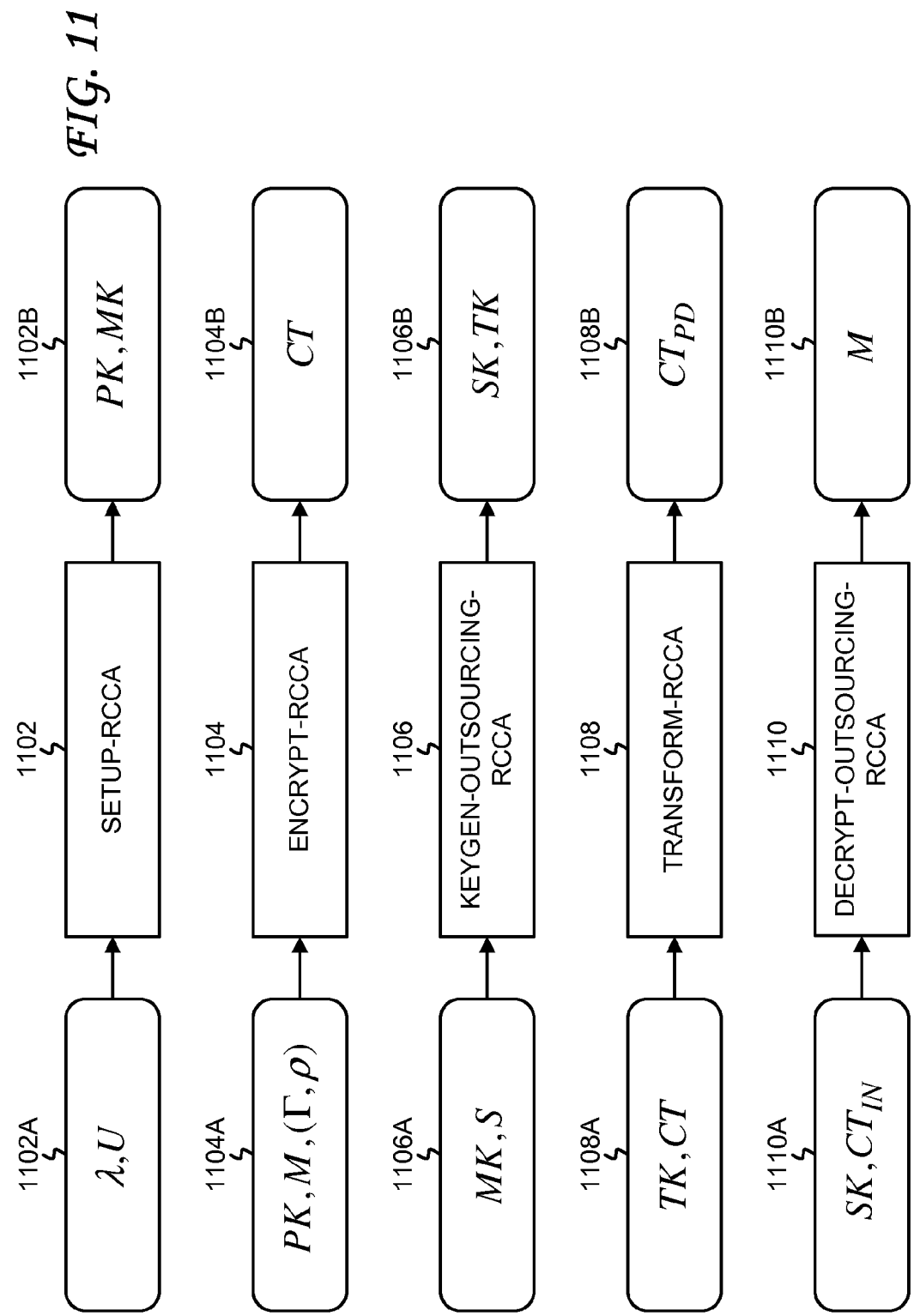
FIG. 11 shows a high-level flowchart of a third embodiment of a method for outsourcing decryption of attribute-based encrypted ciphertexts.

In an embodiment, the outsourcing algorithm includes the algorithms shown in the high-level schematics of FIG. 11. The algorithms include setup, encrypt, key generation, transformation, and decrypt. Details of each algorithm are given below.

Algorithm 1102. Setup-RCCA($\lambda$, U).

The setup-RCCA algorithm 1102 receives the input 1102A and outputs the output 1102B. The setup-RCCA algorithm 1102 is similar to the setup algorithm 1002 previously described in the CPA-secure scheme (FIG. 10), except the public key PK additionally includes the description of hash functions $H_1: \{0,1\}^* \to \mathbb{Z}_p$ and $H_2: \{0,1\}^* \to \{0,1\}^k$.

Algorithm 1104. Encrypt-RCCA(PK, $M \in \{0,1\}^k$, $(\Gamma, \rho)$).

The encryption-RCCA algorithm 1104 receives the input 1104A and the outputs the output 1104B. The input 1104A includes PK, $M \in \{0,1\}^k$, $(\Gamma, \rho)$. The encryption-RCCA algorithm 1104 selects a random $R \in G_T$ and then computes $s = H_1(R, M)$ and $r = H_2(R)$. It then computes $(C_1, D_1), \ldots, (C_l, D_l)$ as in the CPA-secure construction except that s is no longer chosen randomly as part of $\vec{v}$. The output 1104B is the ciphertext CT. The ciphertext CT is published as $$C = R \cdot e(g,g)^{\alpha s}, C' = g^s, C'' = M \oplus r, (C_1, D_1), \ldots, (C_l, D_l)$$

along with a description of the access structure $(\Gamma, \rho)$.

Algorithm 1106. KeyGen-Outsourcing-RCCA(MK, S).

The key-generation-outsourcing-RCCA algorithm 1106 receives the input 1106A and outputs the output 1106B. The key-generation-outsourcing-RCCA algorithm 1106 is the same as the key-generation-outsourcing algorithm 1006 previously described in the CPA-secure scheme (FIG. 10).

Algorithm 1108. Transform-RCCA(TK, CT).

The transformation-RCCA algorithm 1108 receives the input 1108A and outputs the output 1108B. The transformation-RCCA algorithm 1108 recovers the value $e(g, g)^{s\alpha/z}$ as in the transformation algorithm 1008 previously described in the CPA-secure scheme (FIG. 10). It outputs the partially-decrypted ciphertext $CT_{PD}$ as $(C, C'', e(g,g)^{s\alpha/z})$.

Algorithm 1110. Decrypt-Outsourcing-RCCA(SK, CT).

The decryption-outsourcing-RCCA algorithm 1110 receives the input 1110A and outputs the output 1110B. The input 1110A includes the private key SK=(z, TK) and the ciphertext $CT_{IN}$, which can be an ABE ciphertext CT or a PD ciphertext $CT_{PD}$. If the ciphertext $CT_{IN}$ is an ABE ciphertext CT, then the decryption-outsourcing-RCCA algorithm 1110 first executes Transform(TK, CT) as described earlier. If the output is an error message, then the decryption-outsourcing-RCCA algorithm 1110 outputs an error message as well for the output 1110B. Otherwise, it parses the ciphertext as the elements $(T_0, T_1, T_2)$ and computes $R=T_0/T_2^z$, $M=T_1 \oplus H_2(R)$, and $s=H_1(R, M)$. If $T_0=R \cdot e(g,g)^{\alpha s}$ and $T_2=e(g,g)^{\alpha s/z}$, it outputs M as the output 1102B; otherwise, it outputs an error message. If the ciphertext $CT_{IN}$ is a partially-decrypted ciphertext $CT_{PD}$, then the decryption-outsourcing-RCCA algorithm 1110 outputs M as the output 1102B; otherwise, it outputs an error message.

Suppose the large universe construction of Waters is a selectively CPA-secure CP-ABE scheme. Then the outsourcing scheme above is selectively RCCA-secure in the random oracle model for large message spaces. The security of this scheme follows for large message spaces; for example, k-bit spaces where k≥λ, the security parameter. To obtain a secure scheme for smaller message spaces, replace C'' with any CPA-secure symmetric encryption of M using key $H_2(R)$ and let the range of $H_2$ be the key space of this symmetric scheme. In embodiments of the outsourcing scheme implemented for efficiency, large enough message spaces are assumed and the quicker XOR operation is used.

An outsourcing scheme based on the large universe KP-ABE construction due to Goyal, Pandey, Sahai and Waters (GPSW) [Vipul Goyal, Omkant Pandey, Amit Sahai, and Brent Waters. Attribute-based encryption for fine-grained access control of encrypted data. In ACM Conference on Computer and Communications Security, pages 89-98, 2006] is now presented. This construction was originally described using access trees; here, it is generalized to LSSS access structures. The setup and encrypt algorithms are identical to those in GPSW. The key generation algorithm is modified to output a transformation key; a transformation algorithm is introduced; and the decryption algorithm is modified to handle outputs of the encryption algorithm as well as the transformation algorithm.

Figure 12:
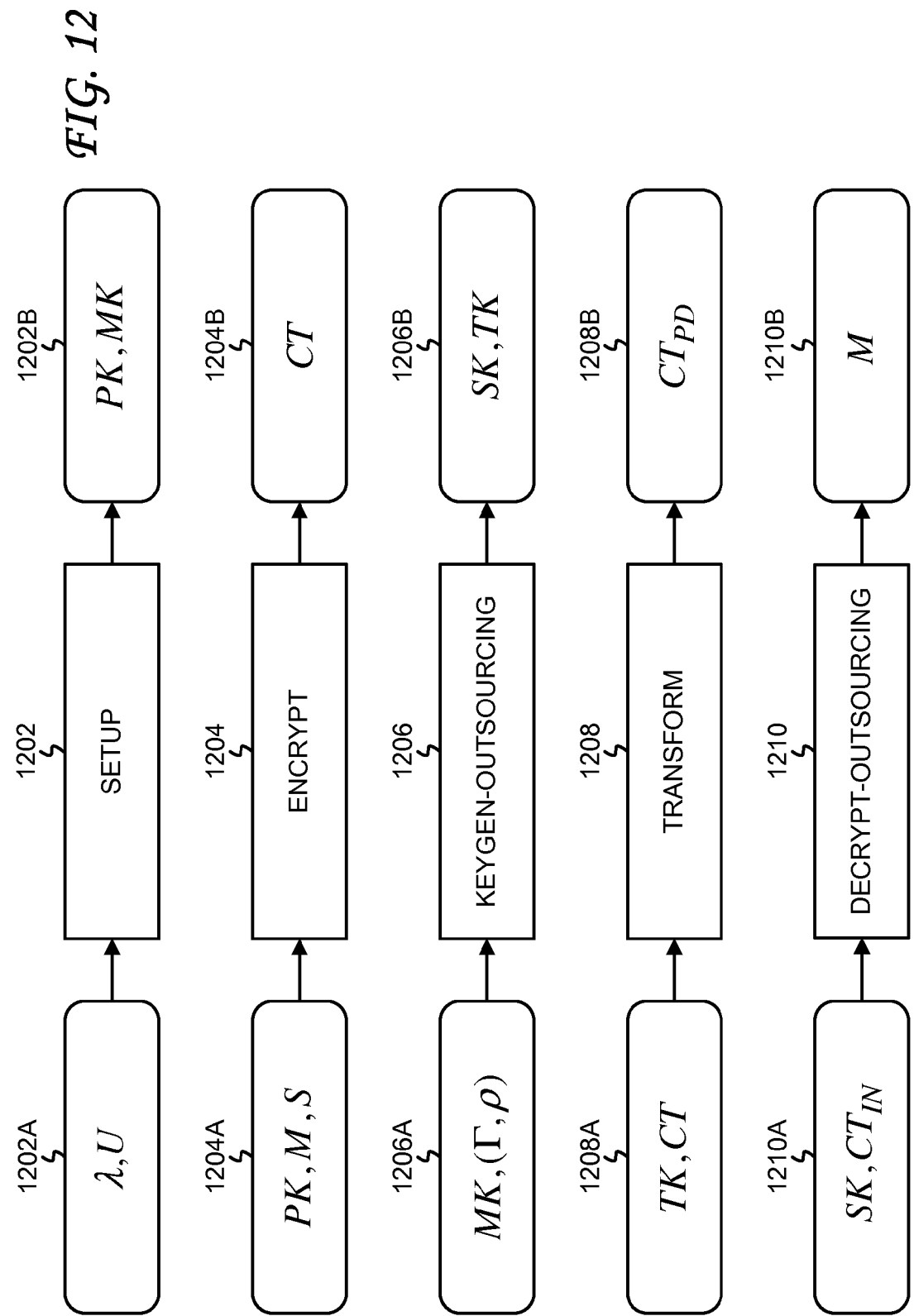
FIG. 12 shows a high-level flowchart of a fourth embodiment of a method for outsourcing decryption of attribute-based encrypted ciphertexts.

In an embodiment, the outsourcing algorithm includes the algorithms shown in the high-level schematics of FIG. 12. The algorithms include setup, encrypt, key generation, transformation, and decrypt. Details of the algorithms are given below.

Algorithm 1202. Setup(λ, U).

The setup algorithm 1202 receives the input 1202A and outputs the output 1202B. The input 1202A includes a security parameter λ and an attribute universe description U. To cover the most general case, let U={0,1}*, the set of binary strings of any length. The setup algorithm then chooses a bilinear group G of prime order p, a generator g, and a hash function F that maps binary strings of any length to G. [See GPSW for details on how to implement this hash in the standard model with restrictions. In the context here, F can be considered as a random oracle.] To simplify the discussion, the scheme with a bilinear group $G=G_1=G_2$ is used as an example, but the scheme can also be implemented in groups where $G_1$ and $G_2$ are distinct. In addition, the setup algorithm chooses random values $\alpha \in \mathbb{Z}_p$ and $h \in G$. The output 1202B includes the master secret key MK and the public key PK. The master authority sets MK=($\alpha$, PK) as the master secret key. The public key is published as PK=(g, $g^\alpha$, h, F).

Algorithm 1204. Encrypt(PK, M, S).

The encryption algorithm 1204 receives the input 1204A and outputs the output 1204B. The input 1204A includes public parameters PK, a message M to encrypt, and a set of attributes S. It chooses a random $s \in \mathbb{Z}_p$. The output 1202B is the ciphertext CT. The ciphertext CT is published as $$C = M \cdot e(g,h)^{\alpha s}, C' = g^s, \{C_x = F(x)^s\}_{x \in S},$$

together with the set of attributes S.

Algorithm 1206. KeyGen-Outsourcing(MK, (Γ, ρ)).

The key-generation-outsourcing algorithm 1206 receives the input 1206A and outputs the output 1206B. The input 1206A includes MK, (Γ, ρ). Parse MK=($\alpha$, PK). Here Γ is an l-row linear secret-sharing matrix over $\mathbb{Z}_p$ and $\rho(i)$ for i=1 to l is a function that maps the rows of Γ to the associated attributes. The key-generation-outsourcing algorithm 1206 first runs the GPSW KeyGen($\alpha$, PK), (Γ, ρ)). The GPSW algorithm first computes secret shares $\lambda_1, \ldots, \lambda_l$ of the master secret a according to the matrix Γ and then selects random values $r'_1, \ldots, r'_l$ in $\mathbb{Z}_p$. The GPSW algorithm then computes $$SK' = (PK, (D_1 = h^{\lambda_1} \cdot F(\rho(1))^{r'_1}, R_1 = g^{r'_1}), \ldots, (D_l, R_l)).$$

Next, the key-generation-outsourcing algorithm 1206 chooses a random value $Z \in \mathbb{Z}_p$, computes the transformation key TK as below, and outputs the private key SK as (z, TK). Denoting $r'_i/z$ as $r_i$; TK is computed as: PK, $(D_1 = D_1'^{1/z} = h^{\lambda_1/z} \cdot F(\rho(1))^{r_1}, R_1 = R_1'^{1/z} = g^{r_1}), \ldots, (D_l = D_l'^{1/z}, R_l = R_l'^{1/z})$. The output 1206B includes the private key) SK and the transformation key TK.

Algorithm 1208. Transform(TK, CT).

The transformation algorithm 1208 receives the input 1208A and outputs the output 1208B. The input 1208A includes a transformation key TK=(PK, $(D_1, R_1), \ldots, (D_l, R_l)$) for access structure (Γ, ρ) and a ciphertext CT=(C, C', $\{C_x\}_{x \in S}$) for attribute set S. If S does not satisfy the access structure, it outputs an error message as the output 1208B. Suppose that S satisfies the access structure and let I ⊂ {1, 2, ..., l} be defined as I={i: $\rho(i) \in S$}. Then, let $\{\omega_i \in \mathbb{Z}_p\}_{i \in I}$ be a set of constants such that if $\{\lambda_i\}$ are valid shares of any secret s according to Γ, then $$\sum_{i \in I} \omega_i \lambda_i = s.$$

The transformation algorithm 1208 computes $$e\left(C', \prod_{i \in I} D_i^{\omega_i}\right) \Big/ \left(\prod_{i \in I} e(R_i, C_{\rho(i)}^{\omega_i})\right) =$$

$$e\left(g^s, \prod_{i \in I} h^{\lambda_i \omega_i / z} \cdot F(\rho(i))^{r_i \omega_i}\right) \Big/ \left(\prod_{i \in I} e(g^{r_i}, F(\rho(i))^{s \omega_i})\right) =$$

-continued $$e(g,h)^{s\alpha/z} \cdot \prod_{i \in I} e(g^s, F(\rho(i))^{r_i \omega_i}) / \left( \prod_{i \in I} e(g^{r_i}, F(\rho(i))^{s \omega_i}) \right) = e(g,h)^{s\alpha/z}.$$

The output 1208B is the partially-decrypted ciphertext $CT_{PD}$, outputted as $(C, e(g,h)^{s\alpha/z})$.

Algorithm 1210. Decrypt-Outsourcing(SK, CT).

The decryption-outsourcing algorithm 1210 receives the input 1210A and outputs the output 1210B. The input 1210A includes a private key SK=(z, TK) and a ciphertext $CT_{IN}$, which can be an ABE ciphertext CT or a PD ciphertext $CT_{PD}$. If the ciphertext $CT_{IN}$ is an ABE ciphertext CT, then the decryption-outsourcing algorithm 1210 first executes Transform(TK, CT). If the output is an error message, then the decryption-outsourcing algorithm 1210 outputs an error message as well for the output 1210B. Otherwise, it parses the ciphertext as the elements $(T_0, T_1)$ and computes $T_0/T_1^z = M$, which is outputted as the output 1210B. If the ciphertext $CT_{IN}$ is a partially-decrypted ciphertext $CT_{PD}$, then the decryption-outsourcing algorithm 1210 outputs M as the output 1210B; otherwise it outputs an error message.

Suppose the GPSW KP-ABE scheme is selectively CPA-secure. Then the KP-ABE scheme described above is a selectively CPA-secure outsourcing scheme. As in the previous construction, the transformation key TK was defined as being created by the master authority. The outsourcing approach above is backwards compatible with existing deployments of the GPSW system. In particular, any existing user with his own GPSW SK can create a corresponding outsourcing pair (SK', TK') by re-randomizing with a random value Z.

Figure 13:
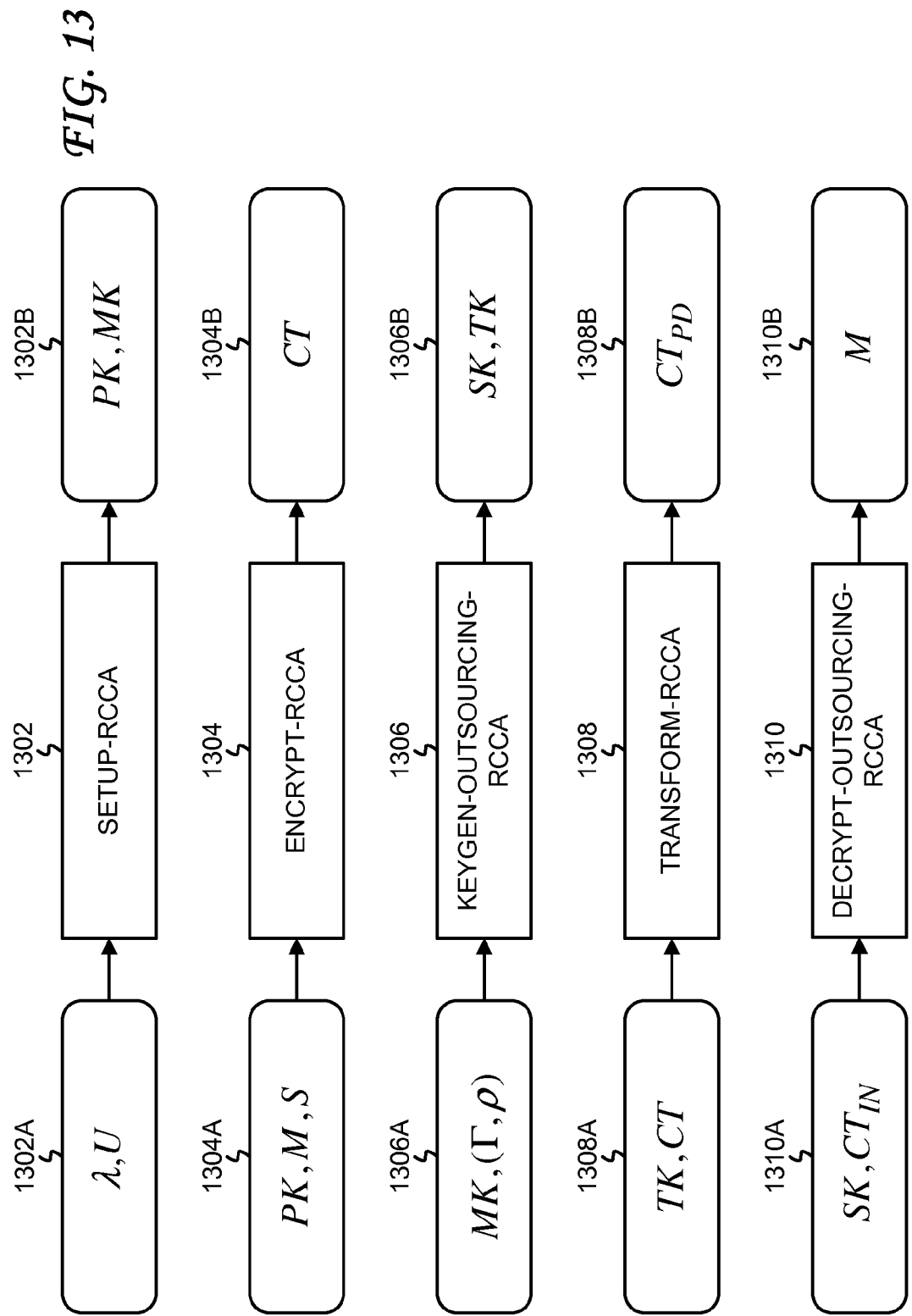
FIG. 13 shows a high-level flowchart of a fifth embodiment of a method for outsourcing decryption of attribute-based encrypted ciphertexts.

The above results, which only hold for CPA-security, are now extended to the stronger RCCA-security guarantee. In an embodiment, the outsourcing algorithm includes the algorithms shown in the high-level schematics of FIG. 13. The algorithms include setup, encrypt, key generation, transformation, and decrypt. Details of the algorithms are given below.

Algorithm 1302. Setup-RCCA(λ, U).

The setup-RCCA algorithm 1302 receives the input 1302A and outputs the output 1302B. The setup-RCCA algorithm 1302 is similar to the setup algorithm 1202 previously described in the CPA-secure scheme (FIG. 12), except the public key additionally includes the value $e(g,h)^\alpha$, which was already computable from existing values, and the description of hash functions $H_1: \{0,1\}^* \to \mathbb{Z}_p$ and $H_2: \{0,1\}^* \to \{0,1\}^k$.

Algorithm 1304. Encrypt-RCCA(PK, M∈$\{0,1\}^k$, S).

The encryption-RCCA algorithm 1304 receives the input 1304A and outputs the output 1304B. The input 1304A includes PK, M∈$\{0,1\}^k$, S. The encryption-RCCA algorithm 1304 chooses a random $R \in G_T$. It then computes $S = H_1(R, M)$ and $r = H_2(R)$. For each attribute $x \in S$, it generates the ciphertext piece $C_x$ as in the CPA-secure scheme. The output 1304B is the ciphertext CT. The ciphertext CT is published as $$C = R \cdot e(g,h)^{\alpha s}, C' = g^s, C'' = r \oplus M, \{C_x\}_{x \in S},$$

along with a description of S.

Algorithm 1306. Keygen-Outsourcing-RCCA(MK, (Γ, ρ)).

The key-generation-outsourcing-RCCA algorithm 1306 receives the input 1306A and outputs the output 1306B. The key-generation-outsourcing-RCCA algorithm 1306 is the same as the key-generation-outsourcing algorithm 1206 previously described in the CPA-secure scheme (FIG. 12).

Algorithm 1308. Transform-RCCA(TK, CT).

The transformation-RCCA algorithm 1308 receives the input 1308A and outputs the output 1308B. The transformation-RCCA algorithm 1308 recovers the value $e(g,h)^{s\alpha/z}$ as in the transformation algorithm 1208 in the CPA-secure scheme (FIG. 12). It outputs the partially-decrypted ciphertext $CT_{PD}$ as $(C, C'', e(g,h)^{s\alpha/z})$ for the output 1308B.

Algorithm 1310. Decrypt-Outsourcing-RCCA(SK, CT).

The decryption-outsourcing-RCCA algorithm 1310 receives the input 1310A and outputs the output 1310B. The input 1310A includes a private key SK=(z, TK) and a ciphertext $CT_{IN}$, which can be an ABE ciphertext CT or a PD ciphertext $CT_{PD}$. If the ciphertext $CT_{IN}$ is an ABE ciphertext CT, then the decryption-outsourcing-RCCA algorithm 1310 first executes Transform(TK, CT). If the output is an error message, then the decryption-outsourcing-RCCA algorithm 1310 outputs an error message as well for the output 1310B. Otherwise, it parses the ciphertext as the elements $(T_0, T_1, T_2)$ and computes $R = T_0/T_2^z$, $M = T_1 \oplus H_2(R)$, and $s = H_1(R, M)$. If $T_0 = R \cdot e(g,h)^{\alpha s}$ and $T_2 = e(g,h)^{\alpha s/z}$, it outputs M as the output 1310B; otherwise, it outputs an error message. If the ciphertext $CT_{IN}$ is a partially-decrypted ciphertext $CT_{PD}$, then the decryption-outsourcing-RCCA algorithm 1310 outputs M as the output 1310B; otherwise, it outputs an error message.

Suppose the construction of GPSW is a selectively CPA-secure KP-ABE scheme. Then the outsourcing scheme above is selectively RCCA-secure in the random oracle model for large message spaces. Here, "large message spaces" are defined as for CP-ABE above.

Two extensions are now described: a method for achieving stronger security and a method for verifying that the transformation was done correctly.

The systems presented above were proven secure in the selective model of security. Embodiments of the systems can be proven to be adaptively secure in the generic group model. The generic group model was defined by Victor Shoup [Victor Shoup. Lower bounds for discrete logarithms and related problems. In EUROCRYPT, pages 256-266, 1997]. It captures all attacks for which the attacker performs group operations, but it does not leverage the specific structure of the algebraic group. Thus, embodiments (including CPA and RCCA variants) are adaptively secure under the assumption that there does not exist a non-generic attack against them.

In the description of the outsourcing techniques above, a proxy can transform any ABE ciphertext into a PD ciphertext for the user. While the security definitions show that an attacker will not be able to learn an encrypted message, there is no guarantee on the transformation's correctness. In some applications, a user might want to request the transformation of a particular ciphertext and efficiently check that the transformation was indeed done correctly (assuming the original ciphertext was valid).

Embodiments of the RCCA systems can be adapted to perform this function by including a ciphertext integrity check into the decryption process. The integrity of both the ABE ciphertext and the PD ciphertext can be checked. This integrity check prevents an attacker from tampering with the original or transformed ciphertext by causing it to decrypt to a different, but related, plaintext. This integrity check can be implemented by adding a check tag to the ciphertext. This tag can be a function of parts of the ciphertext or the underlying plaintext (or both the ciphertext and the plaintext).

The recipient then follows a process for verifying that the ciphertext or its underlying plaintext (or both the ciphertext and the plaintext) matches the attached tag. This verification process and the definition of a match is specified as part of the system. If there is a match, the recipient will accept the decrypted plaintext. If there is not a match, the recipient will reject the ciphertext as invalid.

In one verification process, the ciphertext is first decrypted to recover the plaintext, and the tag is re-computed. The recipient then compares the re-computed tag to the tag attached to the ciphertext. If the tags are a match, then the recipient will accept the plaintext; otherwise, he will reject the ciphertext. The criteria for when two tags match each other are specified as part of the system. Typically, the criteria call for the tags to have the exact same value.

Since decryption results in recovery of the ciphertext randomness, a tag can be added to the ciphertext as H'(r), where H' is a hash function (modeled as a random oracle in the security analysis) and r is the ciphertext randomness. Ciphertext randomness is a random value chosen during the encryption algorithm as part of the process in creating the ciphertext. On recovery of r, the user can compute H'(r) and make sure it matches the tag. In one embodiment, the tag is a hash of one or more portions of the ciphertext, its randomness, or the underlying plaintext. For the integrity check, the tag is re-computed and checked that it is the same as the original.

In a second embodiment, the tag is a digital signature or message authentication code (MAC) on one or more portions of the ciphertext, its randomness, or the underlying plaintext. For the integrity check, the digital signature or the MAC is verified.

In a third embodiment, the tag is a non-interactive zero-knowledge proof or argument involving one or more portions of the ciphertext, its randomness, or the underlying plaintext. For the integrity check, the proof or argument is verified.

Embodiments of the outsourcing algorithms described above for an attribute-based encryption (ABE) system can be applied to more general functional encryption (FE) systems. Instead of encrypting data to individual users, in a functional encryption system, a general access function is embedded into the ciphertext itself. Data access is self-enforcing from the cryptography, requiring no trusted mediator. An ABE system is one form of a functional encryption system. As discussed above, an ABE system can enforce either role-based (via ciphertext-policy ABE) or content-based (via key-policy ABE) access controls.

A functional encryption system for functionality $f$ includes four algorithms:

Setup($\lambda$).

The setup algorithm takes as input a security parameter $\lambda$ and outputs public parameters (also called a public key) PK and a master key (also referred to as a master secret key) MK. This algorithm may optionally take as input additional information about the system specification, such as the description of the set of attributes allowed in an ABE system.

Encrypt(PK, x).

The encryption algorithm takes as input public parameters PK and data x. It outputs a ciphertext CT.

KeyGen(MK, y).

The key generation algorithm takes as input a master key MK and a key descriptor y and outputs a secret key (also referred to as a private key and also referred to as a decryption key) $SK_y$ for this descriptor.

Decrypt($SK_y$, CT).

If CT is an encryption of data X and $SK_y$ is a secret key for y, then the decrypt procedure will output $f(x, y)$, a function of X and y. The decrypted output $f(x, y)$ can be different for different users, depending on the secret key $SK_y$; that is, the decrypted output is not necessarily the original data x for all users. An example of different outputs is described below.

The security stems from the property that someone with a secret key for y should be able to learn $\theta(x, y)$ and nothing else. If someone, or a group of colluding users, has multiple secret keys for $y_1, \ldots, y_k$, then he should only be able to learn the outputs $f(x, y_1), \ldots, f(x, y_k)$ and what can be inferred from these values.

A Key-Policy ABE system is a special case of FE where x is a pair of a message M and a set S of attributes (or variable assignments). The key descriptor y is an access policy. The function $f$ returns the message M if S satisfies the policy y. In addition, the set S of attributes is not hidden and can be learned from the ciphertext.

In Ciphertext-Policy ABE, X is a pair of a message and an access policy $\phi$. The key descriptor y is a set S of attributes (or variable assignments). The function $f$ returns the message M if S satisfies the policy $\phi$. In addition, the policy $\phi$ is not hidden and can be learned from the ciphertext.

In general, ABE is an access control system where the data X is a tuple (a, M), where M is the message and a, the ciphertext descriptor, is some other value or string. M is hidden, a may or may not be. The functionality determines whether or not M should be learned depending on the ciphertext descriptor a and the secret key descriptor y.

Figure 14:
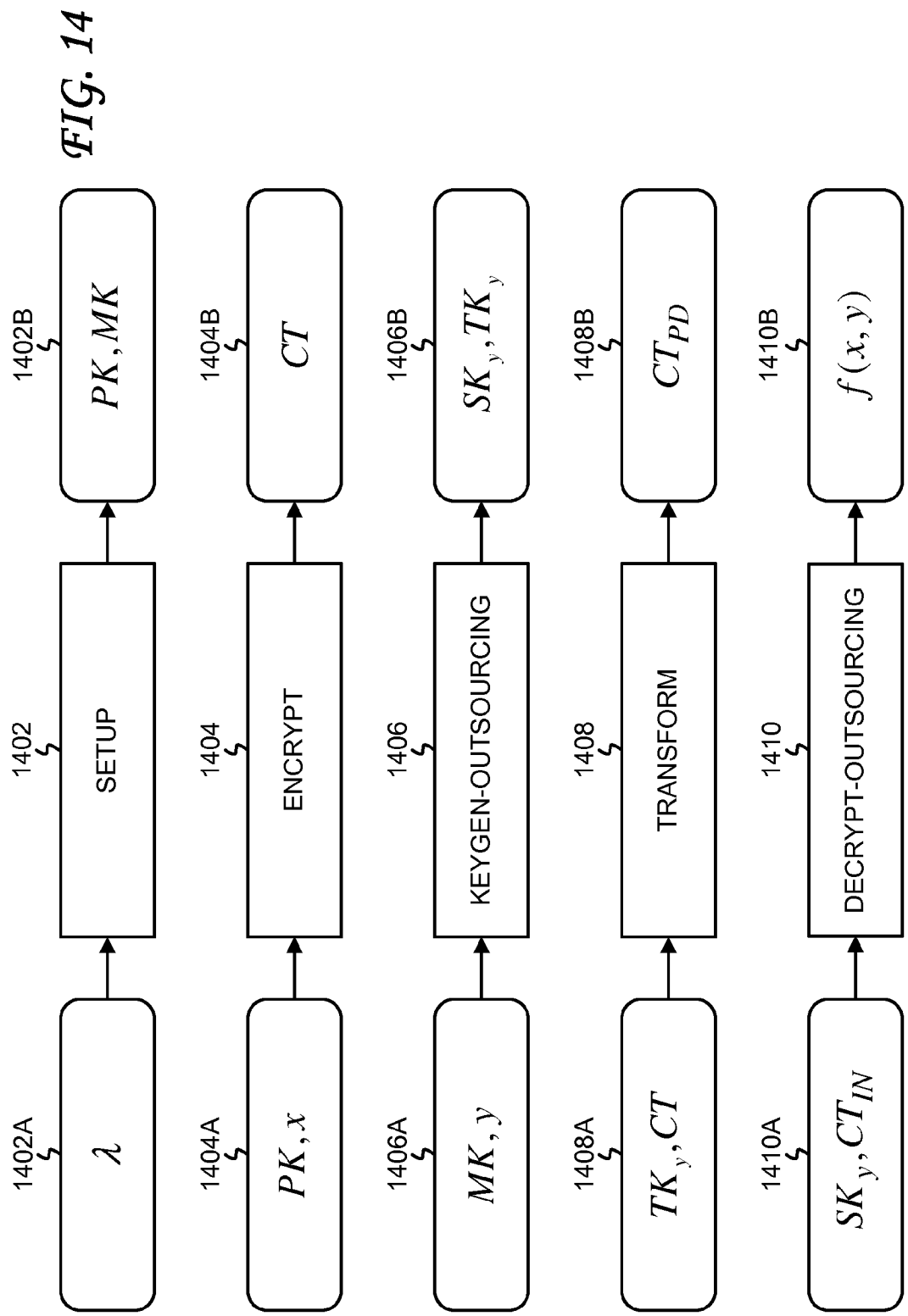
FIG. 14 shows a high-level flowchart of a sixth embodiment of a method for outsourcing decryption of functional encryption ciphertexts.

According to an embodiment of the invention, a functional encryption system includes the algorithms shown in the high-level schematics of FIG. 14. The algorithms include setup, encrypt, key generation, transformation, and decrypt. Details of each algorithm are given below.

Algorithm 1402. Setup($\lambda$).

The setup algorithm 1402 receives the input 1402A and the outputs the output 1402B. The input 1402A is a security parameter $\lambda$, and the output 1402B include public parameters (also called a public key) PK and a master key (also referred to as a master secret key) MK. The input 1402A can also include optional additional information about the system specification, such as the description of the set of attributes allowed in an ABE system.

Algorithm 1404. Encrypt(PK, x).

The encryption algorithm 1404 receives the input 1404A and outputs the output 1404B. The input 1404A includes public parameters PK and data X. The output 1404B is a functional encryption (FE) ciphertext CT.

Algorithm 1406. Keygen-Outsourcing(MK, y).

The key-generation-outsourcing algorithm 1406 receives the input 1406A and outputs the output 1406B. The input 1406 includes a master key MK and a key descriptor y. The output 1406B includes a secret key $SK_y$ and a transformation key $TK_y$ for the key descriptor y.

Algorithm 1408. Transform($TK_y$, CT).

The transformation algorithm 1408 receives the input 1408A and outputs the output 1408B. The input 1408A includes a transformation key $TK_y$ and a FE ciphertext CT. The output 1408B is a partially-decrypted (PD) ciphertext $CT_{PD}$.

Algorithm 1410. Decrypt-Outsourcing($SK_y$, $CT_{IN}$).

The decrypt-outsourcing algorithm 1410 receives the input 1410A and outputs the output 1410B. The input 1410A includes a secret key $SK_y$ and a ciphertext $CT_{IN}$, which can be a FE ciphertext CT or a PD ciphertext $CT_{PD}$. If the received ciphertext $CT_{IN}$ is a FE ciphertext CT, then the decrypt-outsourcing algorithm 1410 first runs Transform($TK_y$, CT) to transform the FE ciphertext CT into the PD ciphertext $CT_{PD}$. If Transform($TK_y$,CT) outputs an error message, then the decrypt-outsourcing algorithm 1410 outputs an error message as well for the output 1410B. If Transform($TK_y$,CT) outputs the PD ciphertext $CT_{PD}$, then the decrypt-outsourcing algorithm 1410 decrypts the ciphertext $CT_{PD}$ and outputs $f(x, y)$ as the output 1410B. If the received ciphertext $CT_{IN}$ is a PD ciphertext $CT_{PD}$, then the decrypt-outsourcing algorithm 1410 decrypts the ciphertext $CT_{PD}$ and outputs $f(x, y)$ as the output 1410B; otherwise it outputs an error message.

In other embodiments, decryption of FE ciphertexts and PD ciphertexts follow a process similar to the one shown in FIG. 16 for decryption of ABE ciphertexts and PD ciphertexts. There are three options for decrypting an FE ciphertext received at a user equipment. In a first option, a FE ciphertext received at a user equipment is sent to a proxy, in which the FE ciphertext is transformed into a PD ciphertext, which is then sent back to the user equipment for decryption. In a second option, a FE ciphertext received at a user equipment is transformed in the user equipment into a PD ciphertext, which is then decrypted in the user equipment. In a third option, a FE ciphertext received at a user equipment is decrypted in the user equipment by a standard FE decryptor without first transforming the FE ciphertext into a PD ciphertext.

Embodiments of the outsourcing algorithms described above for a functional encryption system in general, and an attribute-based encryption system in particular, utilized a transformation key. In other embodiments, no transformation key is needed to transform a functional encryption ciphertext into a partially-decrypted ciphertext, if the functional encryption ciphertext includes unencrypted elements as well as encrypted elements. Herein, "unencrypted elements" refer to elements that can be read in the clear without a decryption key. In particular, all ABE ciphertexts include unencrypted elements.

In a KP-ABE system, the ABE ciphertext is encrypted with a corresponding attribute set, where there are distinct components of the ABE ciphertext for each attribute in the set. The attribute set itself is unencrypted. The proxy can partially decrypt this ABE ciphertext by removing the components associated with attributes that are not part of the access policy embedded in the end user's decryption key. These elements can be removed by a simple deletion of those components, where no secret keys are required.

In one example, a plaintext is encrypted with the set of attributes "accounting", "legal", and "human resources". A particular user possesses a decryption key with the access policy "legal OR human resources". A proxy having auxiliary information about user attributes (without possessing the user's decryption key) can partially decrypt the ABE ciphertext for this user by removing the portions of the ABE ciphertext that correspond to the attribute "accounting", since that attribute does not appear in the user's policy. Similarly, in a CP-ABE system, the proxy can delete components of the ABE ciphertext associated with portions of the policy that a particular user's attributes do not satisfy.

As discussed earlier, ABE can accommodate complex sets of attributes and policies. In a KPE-ABE example, the access policy embedded in the ciphertext can specify a list of 500 universities as recipients. For each university, 20 departments can be specified, and, for each department, finer-grain attributes (such as status=faculty OR graduate student) can be specified. The access policy itself, therefore, can consume a substantial portion of the ciphertext. If a proxy has a database of user profiles that include university affiliation, and the particular recipient is affiliated with MIT, then the proxy can transform the ABE ciphertext into PD ciphertext by deleting the 499 entries in the access policy not associated with MIT. The PD ciphertext can then have a substantially shorter bit length than the ABE ciphertext.

In a functional encryption system, the corresponding process is deletion of components of the FE ciphertext that are not used in the normal decryption procedure with a particular user's decryption key. Deleting components is not the only possible assistance the proxy can provide. The proxy can also perform other computations for the user and attach the outputs of those computations to the partially-decrypted ciphertext, such as executing the normal decryption procedure for the user up to the point at which the decryption key is first needed and then sending this partially-decrypted ciphertext and any appropriate state variables to the user.

In general, for a proxy to transform a functional encryption ciphertext without a transformation key, the functional encryption ciphertext needs to have unencrypted components that can be processed by the proxy. The proxy also needs to have "auxiliary information" associated with the functional encryption ciphertext; in particular, associated with the unencrypted components of the functional encryption ciphertext. Herein, "auxiliary information" refers to the set of user information, time information, and event information.

The following example of a time-based attribute was previously given: a ciphertext for a meeting notice contains the attributes ("recipients=faculty" AND "day=first Monday of every month"). The ciphertext can also contain further attributes such as ("recipients=graduate students" AND "day=Thursday of every week"). If the proxy has the auxiliary information "today is Thursday", then the proxy can delete components of the ciphertext associated with the time "first Monday of every month".

The following example of an event-based attribute was previously given: a ciphertext for a stock transaction contains the attributes ("recipient=financial advisor at ABC Stock Brokers" AND "stock price of Company XYZ exceeds $100"). The ciphertext can also contain further attributes ("recipient=loan officer at DEF Bank" AND "mortgage rate is less than 5%"). If the proxy has the auxiliary information "the stock price of Company XYZ is $50", then the proxy can delete components of the ciphertext associated with the event "the stock price of Company XYZ exceeds $100".

As previously discussed, in a general functional encryption system, the output $f(x, y)$ can be different for different users. The plaintext, for example, can be a project plan for Project X. The project plan includes a general description, a business plan including detailed financial information, and a design document including detailed circuit diagrams. The plaintext can be encrypted in a functional encryption ciphertext that specifies that (1) only users with the attribute "member of Project X" can decrypt the general description, (2) only users with the attributes ("member of Project X" AND "member of marketing division" AND "rank greater than department head") can decrypt the business plan, and (3) only users with the attributes ("member of Project X" AND "member of design team" AND "technical classification of electrical engineer") can decrypt the design document.

As discussed above, transformation of an ABE ciphertext can be processed by a sequence of proxies instead of a single proxy. Similarly, transformation of a general FE ciphertext can be processed by a sequence of proxies instead of a single proxy.

Referring to the above example in which the FE ciphertext includes a project plan for Project X, consider a user with the attributes ("member of Project X" AND "member of design team" AND "technical classification of electrical engineer"). In an embodiment, when he accesses the FE ciphertext, the FE ciphertext is first processed at a first proxy, which has a database of user information (such as user attributes and user policies). The first proxy deletes the business plan, which can have a substantial file size and which cannot be decrypted by the user anyway since he does not have the proper credentials, and transforms the FE ciphertext into a first PD ciphertext. The first PD ciphertext is then sent to a second proxy, which then transforms the first PD ciphertext into a second PD ciphertext; the second PD ciphertext is faster to decrypt than the first PD ciphertext. The second proxy then sends the second PD ciphertext to the user's equipment, which decrypts the second PD ciphertext to recover the general description and the design document. In some embodiments, a proxy uses a transformation key to perform the transformation; in other embodiments, a proxy does not use a transformation key to perform the transformation.

In general, the PD ciphertext generated by transformation, with a transformation key, of an FE encryption ciphertext will be different from the PD ciphertext generated by transformation, without a transformation key, of the same FE encryption ciphertext. In general, the degree of partial decryption that can be performed without a transformation key is more limited than the degree of partial decryption that can be performed with a transformation key.

Figure 15:
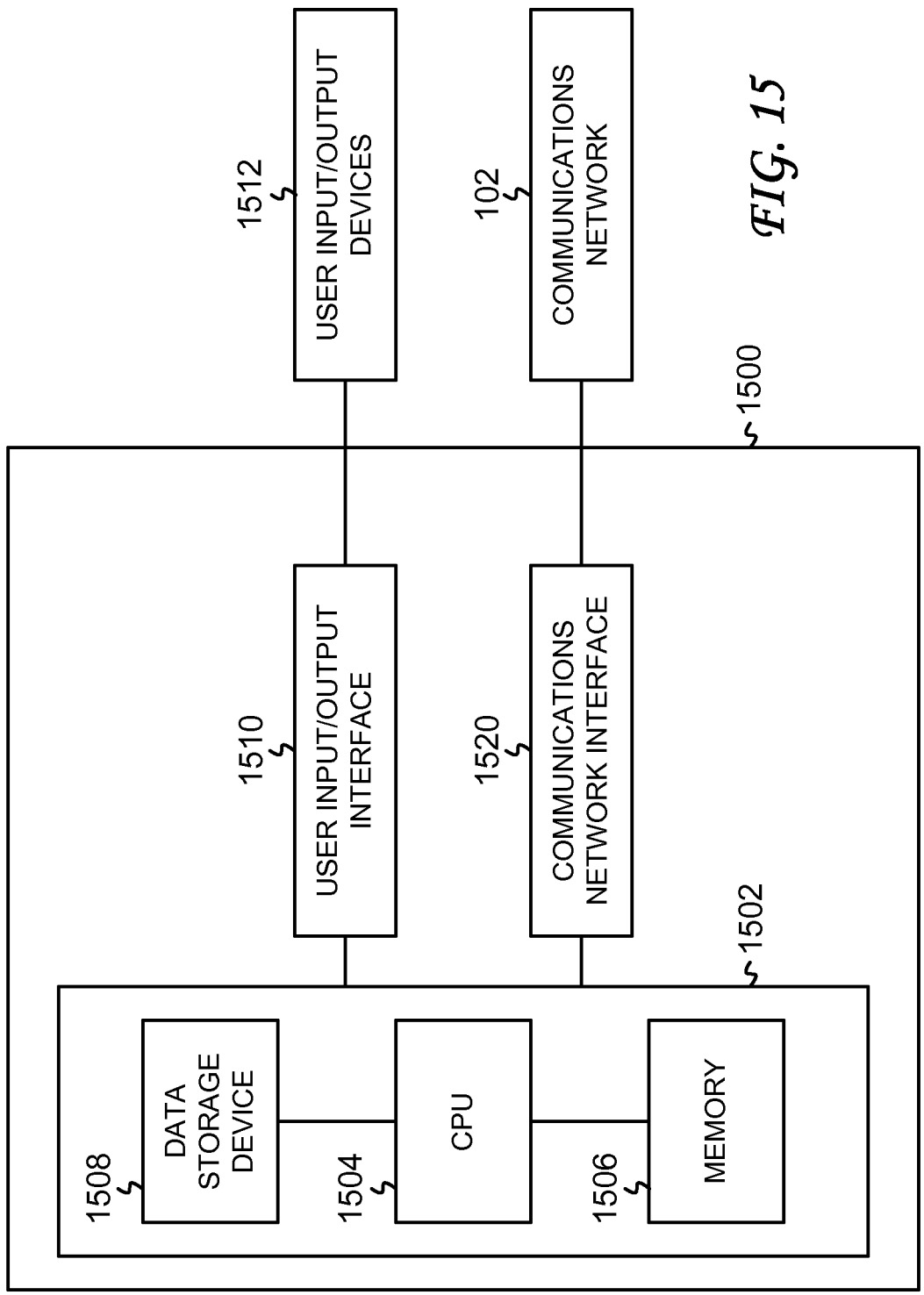
FIG. 15 shows a high-level schematic of a computational system for executing methods for outsourcing decryption of attribute-based encrypted ciphertexts.

FIG. 15 shows a high-level schematic of a computational system, according to an embodiment of the invention, for outsourcing decryption of FE ciphertext in general (and ABE ciphertext in particular). The computational system can represent a user equipment or an applications server. One skilled in the art can construct the computational system 1500 from various combinations of hardware, firmware, and software. One skilled in the art can construct the computational system 1500 from various electronic components, including one or more general purpose processors (such as microprocessors), one or more digital signal processors, one or more application-specific integrated circuits (ASICs), and one or more field-programmable gate arrays (FPGAs).

The computational system 1500 includes a computer 1502, which includes a processor [referred to as the central processing unit (CPU)] 1504, memory 1506, and a data storage device 1508. The data storage device 1508 includes at least one persistent, non-transitory, tangible computer readable medium, such as non-volatile semiconductor memory, a magnetic hard drive, or a compact disc read only memory. The computational system 1500 further includes a user input/output interface 1510, which interfaces the computer 1502 to user input/output devices 1512. Examples of user input/output devices 1512 include a keyboard, a mouse, a local access terminal, and a video display. Data, including computer executable code, can be transferred to and from the computer 1502 via the user input/output interface 1510.

The computational system 1500 further includes a communications network interface 1520, which interfaces the computer 1502 with a communications network, such as the communications network 102 (FIG. 1). A user can access the computer 1502 via a remote access terminal (not shown) communicating with the communications network 102. Data, including computer executable code, can be transferred to and from the computer 1502 via the communications network interface 1520.

As is well known, a computer operates under control of computer software, which defines the overall operation of the computer and applications. The CPU 1504 controls the overall operation of the computer and applications by executing computer program instructions that define the overall operation and applications. The computer program instructions can be stored in the data storage device 1508 and loaded into the memory 1506 when execution of the program instructions is desired. The algorithms shown schematically in FIGS. 8 and 10-14, for example, can be defined by computer program instructions stored in the memory 1506 or in the data storage device 1508 (or in a combination of the memory 1506 and the data storage device 1508) and controlled by the CPU 1504 executing the computer program instructions. For example, the computer program instructions can be implemented as computer executable code programmed by one skilled in the art to perform algorithms. Accordingly, by executing the computer program instructions, the CPU 1504 executes the algorithms shown schematically in FIGS. 8 and 10-14.

In the discussions above, outsourcing was implemented to reduce bandwidth needed to transmit ciphertext from a server to a user equipment or to improve decryption performance by a user equipment. In the embodiment shown in FIG. 1, data is transported between applications servers and user equipment via a communications network.

Figure 17A:
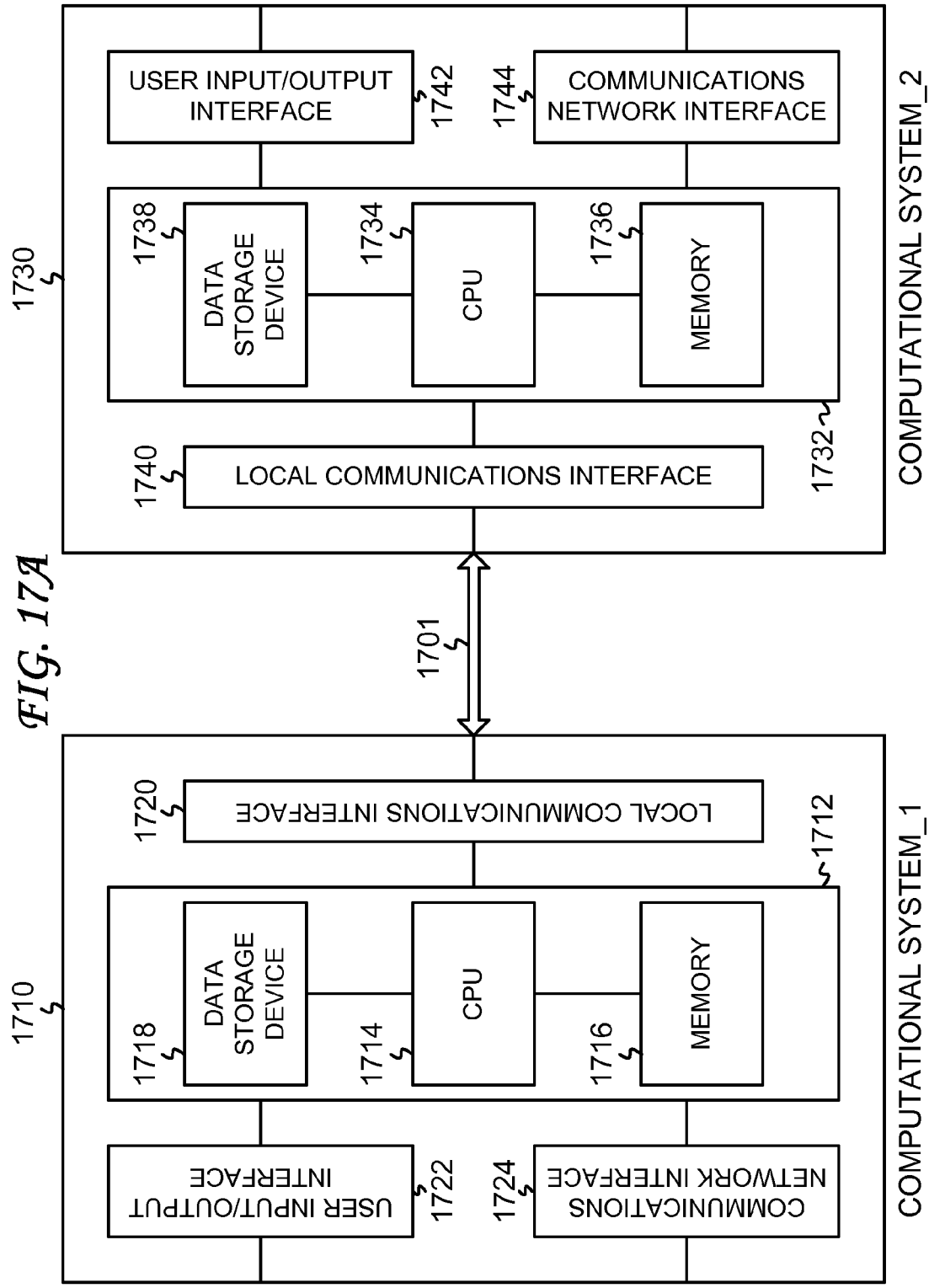
FIG. 17A-FIG. 17C show high-level schematics of computational systems exchanging data via local communications interfaces.

In other embodiments, data is exchanged between two computational systems via a local communications interface. In the embodiment shown in FIG. 17A, data is exchanged between the computational system_1 1710 and the computational system_2 1730. The computational system 1710 includes a computer 1712, which includes a processor (CPU) 1714, memory 1716, and a data storage device 1718. The computational system_1 1710 further includes a local communications interface 1720, a user input/output interface 1722, and a communications network interface 1724. Similarly, the computational system_2 1730 includes a computer 1732, which includes a processor (CPU) 1734, memory 1736, and a data storage device 1738. The computational system_2 1730 further includes a local communications interface 1740, a user input/output interface 1742, and a communications network interface 1744.

Data, referenced as data 1701, is exchanged between the computational system_1 1710 and the computational system_2 1730 via the local communications interface 1720 and the local communications interface 1740.

Examples of the local communications interfaces include both contact interfaces and contactless interfaces. Here, a contact interface requires mechanical and electrical contact between the two computational systems. Contact can be established via direct contact (for example, one computational system plugs into the other computational system) or via a cable. Examples of contact interfaces include an ISO 7816 smartcard interface and a universal serial bus (USB) interface. Examples of contactless interfaces include infrared interfaces and radiofrequency interfaces (such as Bluetooth). Note that a communications network interface can also serve as a local communications interface; for example, two computational systems can be connected via a cross-over cable connecting an Ethernet port on each computational system.

Figure 17B:
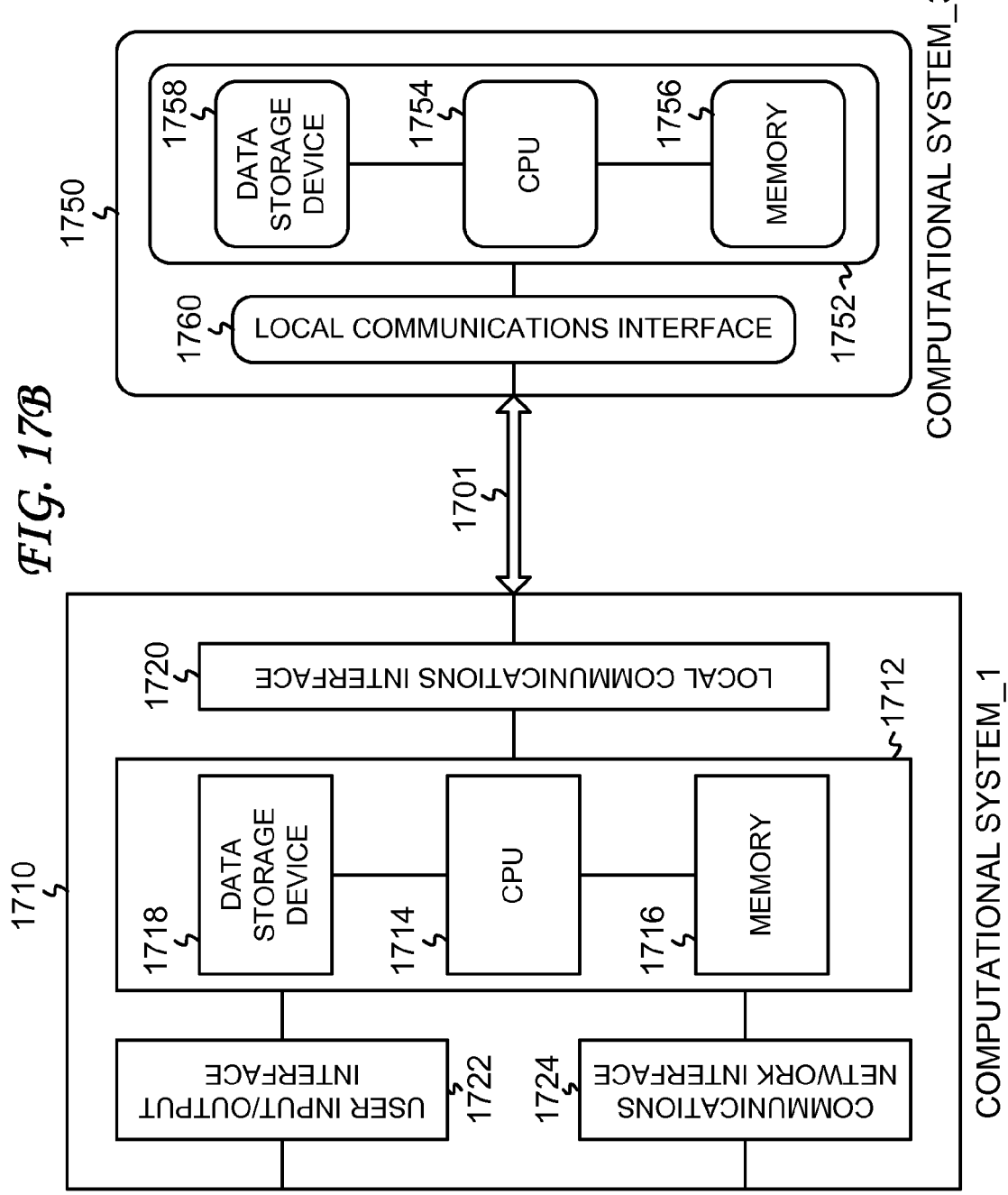

In the embodiment shown in FIG. 17B, data is exchanged between the computational system_1 1710 and the computational system_3 1750. The computational system_3 1750 includes a computer 1752, which includes a processor (CPU) 1754, memory 1756, and a data storage device 1758. The computational system_3 1730 further includes a local communications interface 1760. In this embodiment, the computational system_3 1750 does not have a user input/output interface and does not have a communications network interface.

Data and computer program instructions can be loaded onto the data storage device 1758 via the local communications interface 1760. Data, referenced as data 1701, is exchanged between the computational system_1 1710 and the computational system_3 1750 via the local communications interface 1720 and the local communications interface 1760.

In an embodiment, the computational system_3 1750 is configured as a user computational device, such as a compact, portable device. An example of the computational system_3 1750 is a smartcard. The computational resources (including CPU, memory, and data storage device) of the computational system_3 1750 is more limited than the computational resources of the computational system_1 1710.

In an embodiment, FE ciphertext in general (and ABE ciphertext in particular) is stored in the computational system_3 1750, which does not have sufficient computational resources to rapidly decrypt the FE ciphertext. The computational system_1 1710 acts as a proxy. The computational system_3 1750 sends the FE ciphertext to the computational system_1 1710, which transforms the FE ciphertext into PD ciphertext. The computational system_1 1710 then sends the PD ciphertext back to the computational system_3 1750, which decrypts the PD ciphertext and recovers the plaintext.

Figure 17C:
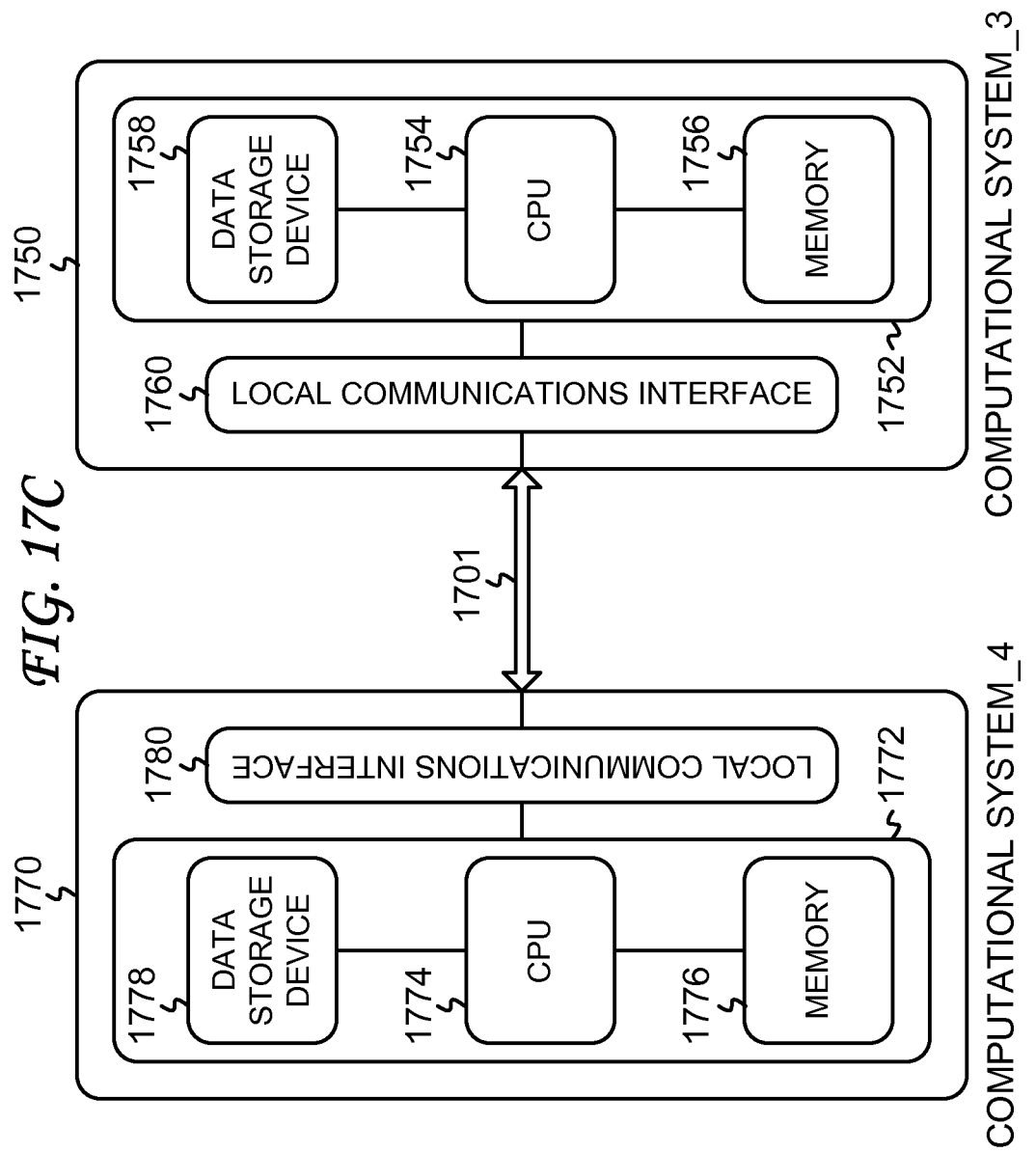

In the embodiment shown in FIG. 17C, data is exchanged between the computational system_3 1750 and the computational system_4 1770, which is configured similar to the computational system_3 1750. The computational system_4 1770 includes a computer 1772, which includes a processor (CPU) 1774, memory 1776, and a data storage device 1778. The computational system_4 1770 further includes a local communications interface 1780. In this embodiment, the computational system_4 1770 does not have a user input/output interface and does not have a communications network interface.

Data and computer program instructions can be loaded onto the data storage device 1778 via the local communications interface 1780. Data, referenced as data 1701, is exchanged between the computational system_3 1750 and the computational system_4 1770 via the local communications interface 1760 and the local communications interface 1780.

Outsourcing can also be used in other applications to enhance security. In general, ABE implementations tend to be relatively complex compared to implementations of other public-key encryption schemes. For example, libfenc's policy handling components alone comprise nearly 3,000 lines of C code, excluding library dependencies. [For details of libfenc, see Matthew Green, Ayo Akinyele, and Michael Rushanan. libfenc: The Functional Encryption Library.] In general, the number of vulnerabilities in a software product tends to increase in proportion to the complexity of the code.

Remote software exploits have become a serious threat to the security of modern computing systems. Traditionally, to leverage these exploits, a malicious party submits carefully-crafted inputs to a computer program (for example, via a network connection) such that the computer program, upon processing these inputs, behaves outside of its design parameters. In serious instances, an attacker can inject arbitrary software code of his choice into the computer's memory, causing the computer to execute instructions of the attacker's choice.

These attacks are a serious concern in the design of cryptographic software, since the cryptographic library stores many critical and secret values such as scheme decryption keys. As noted above, the probability that a system will contain an exploitable design flaw has been shown to increase proportionally to the number of lines of software code in the system.

Modern operating systems provide some security protections against these attacks through "process isolation" or "code isolation", which prevents individual programs from accessing the contents of other programs. Even if a single program becomes the victim of a remote software exploit, these isolation protections should prevent the malicious code from accessing other programs and resources on the system.

More recently, it has become common to use Virtual Machine Manager technology to isolate programs, or even subcomponents of a program, preventing a malicious program from directly accessing the underlying hardware. For example, McCune et al. [Jonathan M. McCune, Yanlin Li, Ning Qu, Zongwei Zhou, Anupam Datta, Virgil D. Gligor, and Adrian Perrig. TrustVisor: Efficient TCB Reduction and Attestation. In IEEE Symposium on Security and Privacy, pages 143-158, May 2010] recently proposed TrustVisor, a specialized hypervisor designed to protect and isolate security-sensitive "Pieces of Application Logic" (PALs) from less sensitive code. In many modern operating systems (such as Microsoft Windows, Apple MacOS, and Android), a similar approach to isolating potentially malicious (or vulnerable) code has become known as "sandboxing".

According to embodiments of the invention, outsourcing is used as a tool to harden ABE implementations in platforms with code or process isolation.

In one embodiment, the outsourcing technique is used in systems containing tamper-resistant hardware; examples of tamper-resistant hardware include hardware security modules (HSMs) and cryptographic smartcards. Refer again to FIG. 17B. As in the example described above, the computational system_1 1710 is configured as a host computational system. The computational system_1 1710 can communicate with a communications network, such as the communications network 102 (FIG. 1), via the communications network interface 1724. Connectivity to the communications network 102 exposes the host computational system 1710 to attacks.

In this embodiment, the computational system_3 1750 is configured as a hardware security module; in particular, a smartcard containing secure code. Security-sensitive code (including the key generation and decrypt-outsourcing routines) run within the computational system_3 1750. The remaining code (including the transformation routines) runs within the computational system_1 1710. Compare FIG. 17 to FIG. 6. The computational system 1710 corresponds to the proxy 608; and the computational system_3 1750 corresponds to the user equipment UE_1 121. The computational system_3 1750 therefore outsources FE decryption to the computational system_1 1710. The principal distinction is in the mode of data exchange. In FIG. 1, data is exchanged between a proxy and a user equipment via a communications network; in FIG. 17B, data is exchanged between a host computational system and a hardware security module via a local communications interface.

Figure 18:
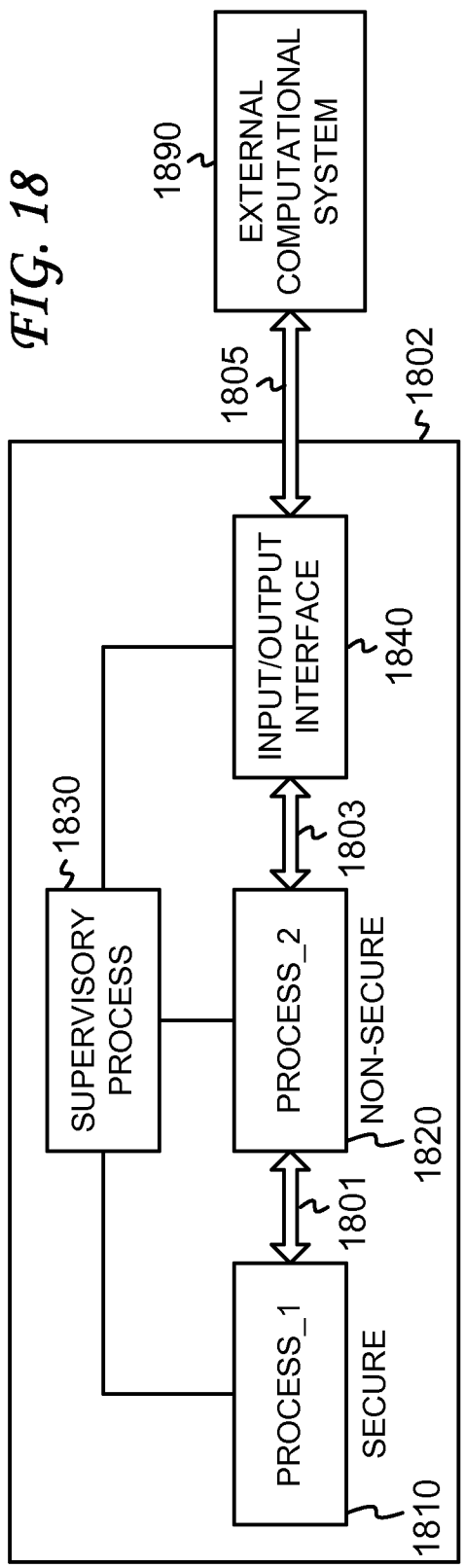
FIG. 18 shows a high-level schematic of a computational system implementing security through self-outsourcing of attribute-based encrypted ciphertexts between isolated processes.
Figure 19:
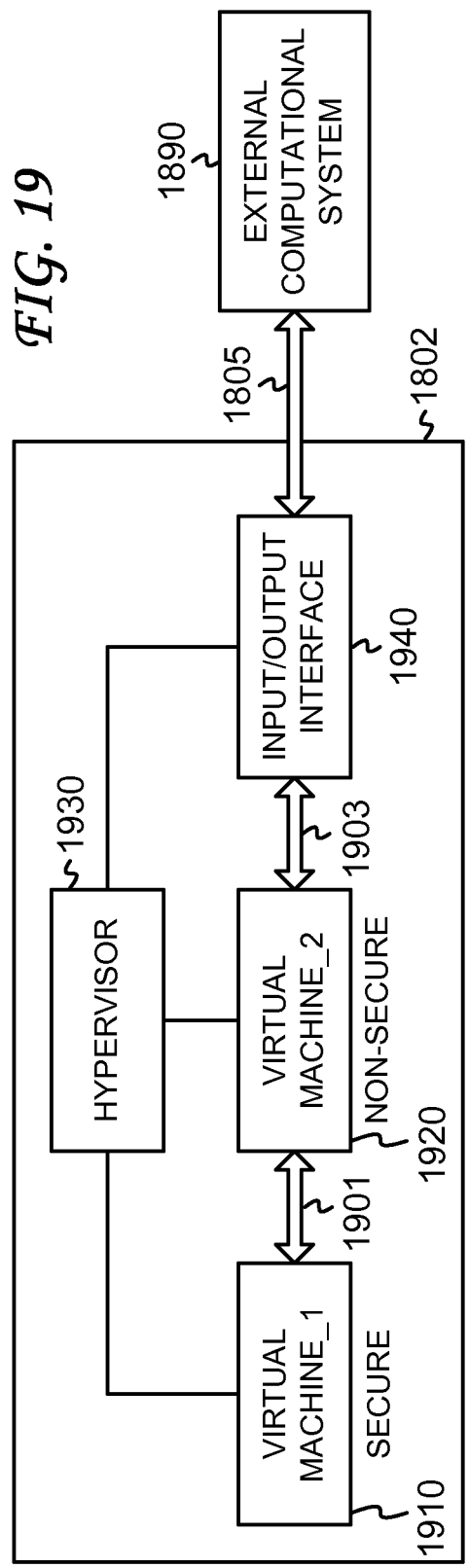
FIG. 19 shows a high-level schematic of a computational system implementing security through self-outsourcing of attribute-based encrypted ciphertexts between virtual machines.

In other embodiments, shown in the high-level schematics of FIG. 18 and FIG. 19, all code is run on a single computational system, referenced as the computational system 1802. To simplify the figures, hardware details of the computational system 1802 are not shown; the hardware details of the computational system 1802 are similar to those of the computational system 1500 (FIG. 15).

In the embodiment shown in FIG. 18, the key generation and decrypt-outsourcing routines are embedded in one isolated (security-sensitive) process (referenced as process_1 1810) and use outsourcing to push the remaining calculations into a second (non-security-sensitive) isolated process (referenced as process_2 1820). Data (referred to as the external data 1805) is exchanged between the computational system 1802 and an external computational system 1890 via the input/output interface 1840. Data exchanged between the input/output interface 1840 and the process_2 1820 is referenced as data 1803. Data exchanged between the process_1 1810 and the process_2 1820 is referenced as data 1801. Supervision of the process_1 1810, the process_2 1820, and the input/output interface 1840 is performed by the supervisory process 1830. The supervisory process 1830 is typically the kernel of the operating system.

In this example, the process_2 1820 is responsible for handling all outside program inputs (such as ciphertexts) and does not have access to the critical ABE decryption keys. If an attacker succeeds in compromising the process_2 1820 (for example, by injecting malicious code into this process), he will not learn the decryption keys.

Compare FIG. 18 to FIG. 6. The process_1 1810 corresponds to the process run in the UE_1 121, and the process_2 1820 corresponds to the process run in the proxy 608. The process_1 1810 therefore outsources ABE decryption to the process_2 1820. Since the process_1 1810 and the process_2 1820 both run on the same piece of equipment, this outsourcing process can be referred to as a "self-outsourcing" process.

Moreover, if RCCA security protections are used, this process will be unable to tamper with ABE ciphertexts. An important advantage of this design is that it significantly reduces the size and complexity of the security-sensitive codebase, thus reducing the likelihood that it will contain vulnerabilities to exploit.

In the embodiment shown in FIG. 19, the system implements a virtual machine manager (hypervisor), such as TrustVisor, to embed the key generation and decrypt-outsourcing routines in security-sensitive code (for example, a TrustVisor PAL) in the virtual machine_1 1910 and use outsourcing to push the remaining calculations into non-security-sensitive code in the virtual machine_2 1920. This process reduces the size of the security-sensitive code base and also simplifies the process of validating the correctness of inputs to the PAL (since the partially-decrypted ABE ciphertext is significantly less complex than the original).

The external data 1805 is exchanged between the computational system 1802 and the external computational system 1890 via the input/output interface 1940. Data exchanged between the input/output interface 1940 and the virtual machine_2 1920 is referenced as data 1903. Data exchanged between the virtual machine_1 1910 and the virtual machine_2 1920 is referenced as data 1901. Supervision of the virtual machine_1 1910, the virtual machine_2 1920, and the input/output interface 1940 is performed by the hypervisor 1930.

Compare FIG. 19 to FIG. 6. The virtual machine_1 1910 corresponds to the UE_1 121, and the virtual machine_2 1920 corresponds to the proxy 608. The virtual machine_1 1910 therefore outsources ABE decryption to the virtual machine_2 1920. Since the virtual machine_1 1910 and the virtual machine_2 1920 both run on the same piece of equipment, this outsourcing process can also be referred to as a "self-outsourcing" process.

The embodiments shown in FIG. 17, FIG. 18, and FIG. 19 for increasing security of a computational system by self-outsourcing the decryption of ABE ciphertext can also be adapted to increasing the security of a computational system by self-outsourcing the decryption of general functional encryption ciphertext.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A machine or computer implemented method for processing a functional encryption ciphertext, the method comprising the steps of:
    receiving the functional encryption ciphertext at a first computational system, wherein either:
    an access control function is embedded with the ciphertext during encryption and an attribute set is embedded with a decryption key; or
    the attribute set is embedded with the ciphertext during encryption and the access control function is embedded with the decryption key;
    receiving a transformation key incapable of fully decrypting the ciphertext into a corresponding plaintext message for any user;
    transforming the functional encryption ciphertext into a partially-decrypted ciphertext at a server computing device based at least in part on the transformation key; and
    sending the partially-decrypted ciphertext to a second computational system, wherein the second computational system is communicatively coupled to the first computational system by a communications interface.

2. The method of claim 1, wherein the functional encryption ciphertext is an attribute-based encryption ciphertext.

3. The method of claim 1, wherein the transformation key is generated based at least in part on a master key of an authority.

4. The method of claim 1, wherein the transformation key is generated based at least in part on a decryption key of a user.

5. The method of claim 1, wherein the functional encryption ciphertext comprises encrypted elements and unencrypted elements, further comprising the step of:
    receiving auxiliary information;
    wherein the step of transforming the functional encryption ciphertext is based at least in part on the unencrypted elements and the auxiliary information.

6. The method of claim 1, wherein:
    the step of receiving the functional encryption ciphertext comprises the step of receiving the functional encryption ciphertext at a proxy; and
    the step of sending the partially-decrypted ciphertext comprises the step of sending the partially-decrypted ciphertext to a user equipment of a user.

7. The method of claim 1, wherein:
    the step of receiving the functional encryption ciphertext comprises the step of receiving the functional encryption ciphertext at a first proxy; and
    the step of sending the partially-decrypted ciphertext comprises the step of sending the partially-decrypted ciphertext to a second proxy.

8. The method of claim 1, wherein at least one of the first computational system and the second computational system is a smartcard.

9. A machine or computer implemented method for decrypting a functional encryption ciphertext, the method comprising the steps of:
    receiving a partially-decrypted ciphertext, wherein the partially-decrypted ciphertext was transformed from the functional encryption ciphertext, at a server computing device, based at least in part on a transformation key incapable of fully decrypting the ciphertext into a corresponding plaintext message for any user;
    wherein either:
    an access control function is embedded with the ciphertext during encryption and an attribute set is embedded with a decryption key; or the attribute set is embedded with the ciphertext during encryption and the access control function is embedded with the decryption key;

receiving a decryption key of a user;

decrypting, at a client computing device, based at least in part on the decryption key of the user, the partially-decrypted ciphertext into plaintext, wherein the partially-decrypted ciphertext was transformed from the functional encryption ciphertext by a first computational system, and wherein the step of receiving the partially-decrypted ciphertext comprises the step of receiving the partially-decrypted ciphertext at a second computational system, wherein the second computational system is communicatively coupled to the first computational system by a communications interface, and wherein the step of decrypting is performed by the second computational system.

10. The method of claim 9, wherein the functional encryption ciphertext is an attribute-based encryption ciphertext.

11. The method of claim 9, wherein:

the step of receiving a partially-decrypted ciphertext comprises the step of receiving the partially-decrypted ciphertext at a user equipment of the user; and the step of decrypting is performed by the user equipment.

12. The method of claim 9, wherein at least one of the first computational system and the second computational system is a smartcard.

13. A machine or computer implemented method for decrypting a functional encryption ciphertext, the method comprising the steps of:

receiving the functional encryption ciphertext at a first computational system, wherein either:

an access control function is embedded with the ciphertext during encryption and an attribute set is embedded with a decryption key; or the attribute set is embedded with the ciphertext during encryption and the access control function is embedded with the decryption key;

receiving a decryption key of a user;

transforming, at a server computing device, the functional encryption ciphertext into a partially-decrypted ciphertext based at least in part on a transformation key incapable of fully decrypting the ciphertext into a corresponding plaintext message for any user;

sending the partially-decrypted ciphertext to a second computational system, wherein the second computational system is communicatively coupled to the first computational system by a communications interface; and decrypting, at a client computing device, based at least in part on the decryption key of the user, the partially-decrypted ciphertext into plaintext.

14. The method of claim 13, wherein the functional encryption ciphertext is an attribute-based encryption ciphertext.

15. The method of claim 13, wherein the step of transforming the functional encryption ciphertext into a partially-decrypted ciphertext comprises the steps of:

generating a transformation key based at least in part on the decryption key of the user; and transforming, based at least in part on the transformation key, the functional encryption ciphertext into the partially-decrypted ciphertext.

16. A non-transitory computer readable medium storing computer program instructions, which, when executed by a processor, cause the processor to perform a method for processing a functional encryption ciphertext, the method comprising the steps of:

receiving the functional encryption ciphertext at a first proxy, wherein either:

an access control function is embedded with the ciphertext during encryption and an attribute set is embedded with a decryption key; or the attribute set is embedded with the ciphertext during encryption and the access control function is embedded with the decryption key;

receiving a transformation key incapable of fully decrypting the ciphertext into a corresponding plaintext message for any user;

transforming the functional encryption ciphertext into a partially-decrypted ciphertext based at least in part on the transformation key at a server computing device; and sending the partially-decrypted ciphertext to a second proxy.

17. The computer readable medium of claim 16, wherein the functional encryption ciphertext is an attribute-based encryption ciphertext.

18. The computer readable medium of claim 16, wherein the method further comprises the step of:

receiving a transformation key;

wherein the step of transforming the functional encryption ciphertext is based at least in part on the transformation key.

19. The computer readable medium of claim 16, wherein the functional encryption ciphertext comprises encrypted elements and unencrypted elements, wherein the method further comprises the step of:

receiving auxiliary information;

wherein the step of transforming the functional encryption ciphertext is based at least in part on the unencrypted elements and the auxiliary information.

20. A non-transitory computer readable medium storing computer program instructions, which, when executed by a processor, cause the processor to perform a method for decrypting a functional encryption ciphertext, the method comprising the steps of:

receiving a partially-decrypted ciphertext at a first computational system, wherein the partially-decrypted ciphertext was transformed from the functional encryption ciphertext at a server computing device based at least in part on a transformation key incapable of fully decrypting the ciphertext into a corresponding plaintext message for any user, wherein either:

an access control function is embedded with the ciphertext during encryption and an attribute set is embedded with a decryption key; or the attribute set is embedded with the ciphertext during encryption and the access control function is embedded with the decryption key;

sending the partially-decrypted ciphertext to a second computational system, wherein the second computational system is communicatively coupled to the first computational system by a communications interface;

receiving a decryption key of a user; and decrypting, at the second computational system, based at least in part on the decryption key of the user, the partially-decrypted ciphertext into plaintext.

21. The computer readable medium of claim 20, wherein the functional encryption ciphertext is an attribute-based encryption ciphertext.

22. A computational system comprising:

a processor;

memory operatively coupled to the processor; and a data storage device operatively coupled to the processor;

wherein the data storage device stores computer program instructions, which, when executed by the processor, cause the processor to perform a method for transforming a functional encryption ciphertext, the method comprising the steps of:

receiving the functional encryption ciphertext at a first proxy, wherein either:

an access control function is embedded with the ciphertext during encryption and an attribute set is embedded with a decryption key; or the attribute set is embedded with the ciphertext during encryption and the access control function is embedded with the decryption key;

receiving a transformation key incapable of fully decrypting the ciphertext into a corresponding plaintext message for any user;

transforming the functional encryption ciphertext into a partially-decrypted ciphertext based at least in part on the transformation key at a server computing device; and sending the partially-decrypted ciphertext to a second proxy.

23. The computational system of claim 22, wherein the computational system comprises a smartcard.

24. The computational system of claim 22, wherein the functional encryption ciphertext is an attribute-based encryption ciphertext.

25. The computational system of claim 22, wherein the method further comprises the step of:

receiving a transformation key;

wherein the step of transforming the functional encryption ciphertext is based at least in part on the transformation key.

26. The computational system of claim 22, wherein the functional encryption ciphertext comprises encrypted elements and unencrypted elements, wherein the method further comprises the step of:

receiving auxiliary information;

wherein the step of transforming the functional encryption ciphertext is based at least in part on the unencrypted elements and the auxiliary information.

27. A computational system comprising:

a processor;

memory operatively coupled to the processor; and a data storage device operatively coupled to the processor; wherein the data storage device stores computer program instructions, which, when executed by the processor, cause the processor to perform a method for decrypting a functional encryption ciphertext, the method comprising the steps of:

receiving a partially-decrypted ciphertext at a first proxy from a server computing device, wherein the partially-decrypted ciphertext was transformed from the functional encryption ciphertext based at least in part on a transformation key incapable of fully decrypting the ciphertext into a corresponding plaintext message for any user, wherein either:

an access control function is embedded with the ciphertext during encryption and an attribute set is embedded with a decryption key; or the attribute set is embedded with the ciphertext during encryption and the access control function is embedded with the decryption key;

receiving a decryption key of a user;

sending the partially-decrypted ciphertext to a second proxy; and decrypting, at a client computing device, based at least in part on the decryption key of the user, the partially-decrypted ciphertext into plaintext.

28. The computational system of claim 27, wherein the computational system comprises a smartcard.

29. The computational system of claim 27, wherein the functional encryption ciphertext is an attribute-based encryption ciphertext.

30. A computational system comprising:

a processor;

memory operatively coupled to the processor; and a data storage device operatively coupled to the processor; wherein the data storage device stores computer program instructions, which, when executed by the processor, cause the processor to perform a method for processing a functional encryption ciphertext, the method comprising the steps of:

receiving, at a server computing device, in a first process, the functional encryption ciphertext, wherein either:

an access control function is embedded with the ciphertext during encryption and an attribute set is embedded with a decryption key; or the attribute set is embedded with the ciphertext during encryption and the access control function is embedded with the decryption key;

at a first computational system, receiving a transformation key incapable of fully decrypting the ciphertext into a corresponding plaintext message for any user;

transforming, in the first process, the functional encryption ciphertext into a partially-decrypted ciphertext based at least in part on the transformation key;

sending the partially-decrypted ciphertext to a second computational system, wherein the second computational system is communicatively coupled to the first computational system by a communications interface; and decrypting, at a client computing device, in a second process, wherein the second process is isolated from the first process, the partially-decrypted ciphertext into plaintext.

31. The computational system of claim 30, wherein the functional encryption ciphertext is an attribute-based encryption ciphertext.

32. The computational system of claim 30, wherein the step of transforming is based at least in part on a transformation key.

33. The computational system of claim 30, wherein the step of decrypting is based at least in part on a decryption key of a user, wherein the decryption key of the user is accessible to the second process, and wherein the decryption key of the user is not accessible to the first process.

34. A computational system comprising:

a processor;

memory operatively coupled to the processor; and a data storage device operatively coupled to the processor; wherein the data storage device stores computer program instructions, which, when executed by the processor, cause the processor to perform a method for decrypting a functional encryption ciphertext, the method comprising the steps of:

receiving the functional encryption ciphertext, wherein either:

an access control function is embedded with the ciphertext during encryption and an attribute set is embedded with a decryption key; or the attribute set is embedded with the ciphertext during encryption and the access control function is embedded with the decryption key;

receiving a decryption key of a user;

transforming the functional encryption ciphertext into a partially-decrypted ciphertext at a first virtual machine based at least in part on a transformation key incapable of fully decrypting the ciphertext into a corresponding plaintext message for any user; and decrypting, at a second virtual machine, based at least in part on the decryption key of the user, the partially-decrypted ciphertext into plaintext.

35. The computational system of claim 34, wherein the functional encryption ciphertext is an attribute-based encryption ciphertext.

36. The computational system of claim 34, wherein the step of transforming the functional encryption ciphertext into a partially-decrypted ciphertext comprises the steps of:

generating a transformation key based at least in part on the decryption key of the user; and transforming, based at least in part on the transformation key, the functional encryption ciphertext into the partially-decrypted ciphertext.

37. The method of claim 1, comprising further decrypting the partially-decrypted ciphertext using only one exponentiation and no pairings to recover a plaintext message.

38. The method of claim 1, comprising further decrypting the partially-decrypted ciphertext to recover a plaintext message using fewer than all of the exponentiations required to decrypt the functional encryption ciphertext and fewer than all of the pairings required to decrypt the plaintext message.

39. The method of claim 1, wherein the partially-decrypted ciphertext is capable of being decrypted using only one exponentiation and no pairings to recover a plaintext message.

40. The method of claim 1, wherein the partially-decrypted ciphertext is capable of being decrypted using fewer transformations to recover a plaintext message than would be required to decrypt the received the functional encryption ciphertext.

41. The method of claim 1, wherein the partially-decrypted ciphertext is capable of being decrypted using fewer cryptographic operations to recover a plaintext message than would be required to decrypt the received the functional encryption ciphertext.

42. The method of claim 1, wherein the partially-decrypted ciphertext is capable of being decrypted faster than a decryption of the received functional encryption ciphertext.

43. The method of claim 1, wherein the partially-decrypted ciphertext has a bit length shorter than the bit length of the received functional encryption ciphertext.

44. A machine or computer implemented method for processing a functional encryption ciphertext, the method comprising the steps of:

receiving the functional encryption ciphertext, wherein either:

an access control function is embedded with the ciphertext during encryption and an attribute set is embedded with a decryption key; or the attribute set is embedded with the ciphertext during encryption and the access control function is embedded with the decryption key;

receiving a transformation key incapable of fully decrypting the ciphertext into a corresponding plaintext message for any user;

transforming the functional encryption ciphertext into a partially-decrypted ciphertext at a server computing device based at least in part on the transformation key;

sending the partially-decrypted ciphertext to a client computing device;

transforming the functional encryption ciphertext into a partially-decrypted ciphertext in a first virtual machine; and decrypting the partially-decrypted ciphertext into plaintext in a second virtual machine.

45. The method of claim 44, further comprising receiving the functional encryption ciphertext at the first virtual machine.

46. The method of claim 44, comprising further decrypting the partially-decrypted ciphertext based at least in part on a decryption key of a user, wherein the decryption key of the user is accessible to the second virtual machine, and wherein the decryption key of the user is not accessible to the first virtual machine.

47. The method of claim 44, further comprising, at a hypervisor, supervising the transforming performed in the first virtual machine and the decrypting performed in the second virtual machine.

* * * * *